(12) United States Patent
Zhai et al.

(10) Patent No.: US 9,021,380 B2
(45) Date of Patent: Apr. 28, 2015

(54) INCREMENTAL MULTI-TOUCH GESTURE RECOGNITION

(71) Applicants: Shumin Zhai, Los Altos, CA (US); Xiaojun Bi, Sunnyvale, CA (US); Yu Ouyang, San Jose, CA (US)

(72) Inventors: Shumin Zhai, Los Altos, CA (US); Xiaojun Bi, Sunnyvale, CA (US); Yu Ouyang, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/646,521

(22) Filed: Oct. 5, 2012

(65) Prior Publication Data

US 2014/0098023 A1    Apr. 10, 2014

(51) Int. Cl.
    *G06F 3/048*     (2013.01)
    *G06F 3/023*     (2006.01)
    *G06F 3/0488*    (2013.01)

(52) U.S. Cl.
    CPC .... *G06F 3/0237* (2013.01); *G06F 2203/04808* (2013.01); *G06F 3/04883* (2013.01); *G06F 3/04886* (2013.01)

(58) Field of Classification Search
    CPC ............ G06F 3/04886; G06F 3/04883; G06F 3/0236; G06F 3/0237
    USPC ................... 715/773, 780, 812, 863; 345/168
    See application file for complete search history.

(56) References Cited

U.S. PATENT DOCUMENTS

| | | | |
|---|---|---|---|
| 4,534,261 A * | 8/1985 | Fabrizio ......................... 84/384 |
| 4,833,610 A | 5/1989 | Zamora et al. | |
| 4,847,766 A | 7/1989 | McRae et al. | |
| 4,988,981 A * | 1/1991 | Zimmerman et al. ........ 345/158 |
| 5,307,267 A * | 4/1994 | Yang .............................. 715/210 |
| 5,319,747 A * | 6/1994 | Gerrissen et al. ............. 715/839 |
| 5,440,070 A * | 8/1995 | Okamoto et al. ............... 84/600 |
| 5,502,803 A * | 3/1996 | Yoshida et al. ............... 715/201 |
| 5,521,986 A * | 5/1996 | Curtin et al. .................. 382/187 |
| 5,606,494 A * | 2/1997 | Oshima et al. ................. 700/59 |
| 5,677,710 A * | 10/1997 | Thompson-Rohrlich ..... 345/173 |
| 5,684,873 A * | 11/1997 | Tiilikainen .................... 379/354 |

(Continued)

FOREIGN PATENT DOCUMENTS

| | | |
|---|---|---|
| EP | 0844570 A2 | 5/1998 |
| EP | 1603014 A1 | 7/2005 |

(Continued)

OTHER PUBLICATIONS

U.S. Appl. No. 13/163,056, by Gabriel Aaron Cohen, filed Jun. 17, 2011.

(Continued)

*Primary Examiner* — Anil Bhargava
(74) *Attorney, Agent, or Firm* — Shumaker & Sieffert, P.A.

(57) ABSTRACT

In one example, a method comprises outputting, by a computing device and for display at an output device, a graphical keyboard comprising a plurality of keys, and receiving, by the computing device, an indication of a multi-touch gesture detected at a presence-sensitive display, the multi-touch gesture comprising a first sub-gesture that traverses a first group of keys of the plurality of keys and a second sub-gesture that traverses a second group of keys of the plurality of keys. This example method further comprises determining, in response to detecting the first sub-gesture and the second sub-gesture, a candidate word based at least in part on the first and second groups of keys, and outputting, by the computing device and for display at the output device, the candidate word.

28 Claims, 9 Drawing Sheets

(56) References Cited

U.S. PATENT DOCUMENTS

| | | | |
|---|---|---|---|
| 5,717,939 A * | 2/1998 | Bricklin et al. | 715/212 |
| 5,748,512 A | 5/1998 | Vargas | |
| 5,761,689 A | 6/1998 | Rayson et al. | |
| 5,765,180 A | 6/1998 | Travis | |
| 5,781,179 A * | 7/1998 | Nakajima et al. | 345/157 |
| 5,784,504 A * | 7/1998 | Anderson et al. | 382/309 |
| 5,805,167 A * | 9/1998 | van Cruyningen | 715/808 |
| 5,845,306 A | 12/1998 | Schabes et al. | |
| 5,848,187 A * | 12/1998 | Bricklin et al. | 382/187 |
| 5,903,229 A * | 5/1999 | Kishi | 341/20 |
| 5,905,246 A * | 5/1999 | Fajkowski | 235/375 |
| 5,917,493 A * | 6/1999 | Tan et al. | 715/835 |
| 5,953,541 A * | 9/1999 | King et al. | 710/67 |
| 6,008,799 A | 12/1999 | Van Kleeck | |
| 6,032,053 A | 2/2000 | Schroeder et al. | |
| 6,041,292 A | 3/2000 | Jochim | |
| 6,047,300 A | 4/2000 | Walfish | |
| 6,057,845 A * | 5/2000 | Dupouy | 715/863 |
| 6,061,050 A * | 5/2000 | Allport et al. | 345/173 |
| 6,072,473 A * | 6/2000 | Muller et al. | 345/173 |
| 6,094,188 A * | 7/2000 | Horton et al. | 345/158 |
| 6,115,482 A * | 9/2000 | Sears et al. | 382/114 |
| 6,131,102 A | 10/2000 | Potter | |
| 6,150,600 A * | 11/2000 | Buchla | 84/688 |
| 6,160,555 A * | 12/2000 | Kang et al. | 715/860 |
| 6,278,453 B1 * | 8/2001 | Bodnar | 715/764 |
| 6,286,064 B1 * | 9/2001 | King et al. | 710/67 |
| 6,292,179 B1 | 9/2001 | Lee | |
| 6,310,634 B1 * | 10/2001 | Bodnar et al. | 715/854 |
| 6,340,979 B1 * | 1/2002 | Beaton et al. | 715/764 |
| RE37,654 E * | 4/2002 | Longo | 84/626 |
| 6,396,523 B1 * | 5/2002 | Segal et al. | 715/863 |
| 6,417,874 B2 * | 7/2002 | Bodnar | 715/854 |
| 6,424,983 B1 | 7/2002 | Schabes et al. | |
| 6,438,523 B1 * | 8/2002 | Oberteuffer et al. | 704/270 |
| 6,512,838 B1 * | 1/2003 | Rafii et al. | 382/106 |
| 6,542,170 B1 | 4/2003 | Williams et al. | |
| 6,570,557 B1 * | 5/2003 | Westerman et al. | 345/173 |
| 6,573,844 B1 | 6/2003 | Venolia et al. | |
| 6,630,924 B1 * | 10/2003 | Peck | 345/168 |
| 6,674,895 B2 * | 1/2004 | Rafii et al. | 382/154 |
| 6,686,931 B1 * | 2/2004 | Bodnar | 715/741 |
| 6,789,231 B1 | 9/2004 | Reynar et al. | |
| 6,801,190 B1 | 10/2004 | Robinson et al. | |
| 6,983,247 B2 | 1/2006 | Ringger et al. | |
| 7,028,259 B1 | 4/2006 | Jacobson | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,170,430 B2 | 1/2007 | Goodgoll | |
| 7,199,786 B2 | 4/2007 | Suraqui | |
| 7,207,004 B1 | 4/2007 | Harrity | |
| 7,231,343 B1 | 6/2007 | Treadgold et al. | |
| 7,250,938 B2 | 7/2007 | Kirkland et al. | |
| 7,251,367 B2 * | 7/2007 | Zhai | 382/229 |
| 7,269,019 B2 | 9/2007 | Hirata et al. | |
| 7,277,088 B2 | 10/2007 | Robinson et al. | |
| 7,296,019 B1 | 11/2007 | Chandrasekar et al. | |
| 7,336,827 B2 | 2/2008 | Geiger et al. | |
| 7,366,983 B2 | 4/2008 | Brill et al. | |
| 7,382,358 B2 | 6/2008 | Kushler et al. | |
| 7,453,439 B1 * | 11/2008 | Kushler et al. | 345/168 |
| 7,479,949 B2 | 1/2009 | Jobs et al. | |
| 7,487,461 B2 * | 2/2009 | Zhai et al. | 715/773 |
| 7,508,324 B2 | 3/2009 | Suraqui | |
| 7,542,029 B2 | 6/2009 | Kushler | |
| 7,706,616 B2 | 4/2010 | Kristensson et al. | |
| 7,716,579 B2 | 5/2010 | Gunn et al. | |
| 7,730,402 B2 | 6/2010 | Song | |
| 7,750,891 B2 | 7/2010 | Stephanick et al. | |
| 7,809,719 B2 | 10/2010 | Furuuchi et al. | |
| 7,831,423 B2 | 11/2010 | Schubert | |
| 7,880,730 B2 | 2/2011 | Robinson et al. | |
| 7,886,233 B2 | 2/2011 | Rainisto et al. | |
| 7,895,518 B2 | 2/2011 | Kristensson | |
| 7,907,125 B2 | 3/2011 | Weiss et al. | |
| 7,920,132 B2 | 4/2011 | Longe et al. | |
| 7,921,361 B2 | 4/2011 | Gunn et al. | |
| 7,973,770 B2 | 7/2011 | Tokkonen | |
| 8,036,878 B2 | 10/2011 | Assadollahi | |
| 8,059,101 B2 | 11/2011 | Westerman et al. | |
| 8,135,582 B2 | 3/2012 | Suraqui | |
| 8,232,972 B2 | 7/2012 | Huang et al. | |
| 8,232,973 B2 | 7/2012 | Kocienda et al. | |
| 8,266,528 B1 | 9/2012 | Hayes | |
| 8,280,886 B2 | 10/2012 | Labrou et al. | |
| 8,359,543 B2 | 1/2013 | Sengupta | |
| 8,438,160 B2 | 5/2013 | Aravamudan et al. | |
| 8,514,178 B2 | 8/2013 | Song et al. | |
| 8,542,206 B2 | 9/2013 | Westerman et al. | |
| 8,552,984 B2 | 10/2013 | Knaven | |
| 8,587,542 B2 | 11/2013 | Moore | |
| 8,619,048 B2 | 12/2013 | Shimoni | |
| 8,667,414 B2 | 3/2014 | Zhai et al. | |
| 8,701,032 B1 | 4/2014 | Zhai et al. | |
| 8,782,549 B2 | 7/2014 | Ouyang et al. | |
| 8,819,574 B2 | 8/2014 | Ouyang et al. | |
| 2002/0013794 A1 | 1/2002 | Carro et al. | |
| 2002/0015064 A1 | 2/2002 | Robotham et al. | |
| 2002/0129012 A1 | 9/2002 | Green et al. | |
| 2002/0143543 A1 | 10/2002 | Sirivara | |
| 2002/0194223 A1 | 12/2002 | Meyers et al. | |
| 2003/0006967 A1 * | 1/2003 | Pihlaja | 345/168 |
| 2003/0095053 A1 | 5/2003 | Kandogan et al. | |
| 2003/0095104 A1 | 5/2003 | Kandogan et al. | |
| 2003/0097252 A1 | 5/2003 | Mackie | |
| 2003/0165801 A1 | 9/2003 | Levy | |
| 2004/0120583 A1 | 6/2004 | Zhai | |
| 2004/0140956 A1 * | 7/2004 | Kushler et al. | 345/168 |
| 2005/0052406 A1 | 3/2005 | Stephanick et al. | |
| 2005/0114115 A1 | 5/2005 | Kardis et al. | |
| 2005/0171783 A1 | 8/2005 | Suominen | |
| 2005/0190973 A1 * | 9/2005 | Kristensson et al. | 382/229 |
| 2006/0004638 A1 | 1/2006 | Royal et al. | |
| 2006/0026536 A1 * | 2/2006 | Hotelling et al. | 715/863 |
| 2006/0028450 A1 | 2/2006 | Suraqui | |
| 2006/0050962 A1 | 3/2006 | Geiger et al. | |
| 2006/0053387 A1 | 3/2006 | Ording | |
| 2006/0055669 A1 | 3/2006 | Das | |
| 2006/0119582 A1 | 6/2006 | Ng et al. | |
| 2006/0173674 A1 | 8/2006 | Nakajima et al. | |
| 2006/0176283 A1 | 8/2006 | Suraqui | |
| 2006/0253793 A1 | 11/2006 | Zhai et al. | |
| 2006/0256139 A1 | 11/2006 | Gikandi | |
| 2006/0265648 A1 | 11/2006 | Rainisto et al. | |
| 2007/0016862 A1 | 1/2007 | Kuzmin | |
| 2007/0040813 A1 * | 2/2007 | Kushler et al. | 345/173 |
| 2007/0083276 A1 | 4/2007 | Song | |
| 2007/0089070 A1 | 4/2007 | Jaczyk | |
| 2007/0094024 A1 | 4/2007 | Kristensson et al. | |
| 2007/0213983 A1 | 9/2007 | Ramsey | |
| 2008/0017722 A1 | 1/2008 | Snyder et al. | |
| 2008/0100579 A1 | 5/2008 | Robinson et al. | |
| 2008/0122796 A1 | 5/2008 | Jobs et al. | |
| 2008/0167858 A1 | 7/2008 | Christie et al. | |
| 2008/0172293 A1 | 7/2008 | Raskin et al. | |
| 2008/0229255 A1 * | 9/2008 | Linjama et al. | 715/863 |
| 2008/0232885 A1 | 9/2008 | Mock et al. | |
| 2008/0270896 A1 | 10/2008 | Kristensson | |
| 2008/0316183 A1 | 12/2008 | Westerman et al. | |
| 2009/0058823 A1 | 3/2009 | Kocienda | |
| 2009/0100338 A1 * | 4/2009 | Saetti | 715/716 |
| 2009/0100383 A1 | 4/2009 | Sunday et al. | |
| 2009/0119376 A1 | 5/2009 | Bomma | |
| 2009/0189864 A1 | 7/2009 | Walker et al. | |
| 2010/0021871 A1 | 1/2010 | Layng et al. | |
| 2010/0029910 A1 | 2/2010 | Shiba et al. | |
| 2010/0070908 A1 | 3/2010 | Mori et al. | |
| 2010/0079382 A1 | 4/2010 | Suggs | |
| 2010/1179382 | 4/2010 | Suggs | |

(56) References Cited

U.S. PATENT DOCUMENTS

| | | | |
|---|---|---|---|
| 2010/0125594 A1 | 5/2010 | Li et al. | |
| 2010/0131447 A1 | 5/2010 | Creutz et al. | |
| 2010/0141484 A1 | 6/2010 | Griffin et al. | |
| 2010/0199226 A1 | 8/2010 | Nurmi | |
| 2010/0235780 A1 | 9/2010 | Westerman et al. | |
| 2010/0238125 A1 | 9/2010 | Ronkainen | |
| 2010/0257478 A1 | 10/2010 | Longe et al. | |
| 2010/0259493 A1 | 10/2010 | Chang et al. | |
| 2010/0271299 A1 | 10/2010 | Stephanick et al. | |
| 2010/0315266 A1 | 12/2010 | Gunawardana et al. | |
| 2011/0061017 A1 | 3/2011 | Ullrich et al. | |
| 2011/0063224 A1 | 3/2011 | Vexo et al. | |
| 2011/0063231 A1 | 3/2011 | Jakobs et al. | |
| 2011/0066984 A1 | 3/2011 | Li | |
| 2011/0071834 A1 | 3/2011 | Kristensson et al. | |
| 2011/0103682 A1 | 5/2011 | Chidlovskii et al. | |
| 2011/0107206 A1 | 5/2011 | Walsh et al. | |
| 2011/0119617 A1 | 5/2011 | Kristensson | |
| 2011/0122081 A1* | 5/2011 | Kushler | 345/173 |
| 2011/0141027 A1* | 6/2011 | Ghassabian | 345/168 |
| 2011/0141031 A1* | 6/2011 | McCullough et al. | 345/173 |
| 2011/0179380 A1* | 7/2011 | Shaffer et al. | 715/781 |
| 2011/0179386 A1* | 7/2011 | Shaffer et al. | 715/835 |
| 2011/0179387 A1* | 7/2011 | Shaffer et al. | 715/835 |
| 2011/0193797 A1 | 8/2011 | Unruh | |
| 2011/0202834 A1 | 8/2011 | Mandryk et al. | |
| 2011/0202836 A1 | 8/2011 | Badger et al. | |
| 2011/0205160 A1 | 8/2011 | Song et al. | |
| 2011/0208511 A1 | 8/2011 | Sikstrom et al. | |
| 2011/0208513 A1 | 8/2011 | Nicks et al. | |
| 2011/0209088 A1 | 8/2011 | Hinckley et al. | |
| 2011/0210850 A1 | 9/2011 | Tran | |
| 2011/0234524 A1 | 9/2011 | Longe et al. | |
| 2011/0242000 A1 | 10/2011 | Bi et al. | |
| 2011/0254798 A1 | 10/2011 | Adamson et al. | |
| 2011/0291940 A1* | 12/2011 | Ghassabian | 345/169 |
| 2012/0011462 A1* | 1/2012 | Westerman et al. | 715/773 |
| 2012/0029910 A1 | 2/2012 | Medlock et al. | |
| 2012/0036468 A1 | 2/2012 | Colley | |
| 2012/0036469 A1* | 2/2012 | Suraqui | 715/773 |
| 2012/0036485 A1 | 2/2012 | Watkins, Jr. et al. | |
| 2012/0046544 A1 | 2/2012 | Inoue | |
| 2012/0075190 A1 | 3/2012 | Sengupta | |
| 2012/0079412 A1 | 3/2012 | Kocienda et al. | |
| 2012/0098846 A1 | 4/2012 | Wun et al. | |
| 2012/0113008 A1 | 5/2012 | Makinen et al. | |
| 2012/0127080 A1 | 5/2012 | Kushler et al. | |
| 2012/0127082 A1 | 5/2012 | Kushler et al. | |
| 2012/0131035 A1 | 5/2012 | Yang et al. | |
| 2012/0162092 A1 | 6/2012 | Pasquero et al. | |
| 2012/0166428 A1 | 6/2012 | Kakade et al. | |
| 2012/0223889 A1* | 9/2012 | Medlock et al. | 345/168 |
| 2012/0242579 A1* | 9/2012 | Chua | 345/168 |
| 2012/0259615 A1 | 10/2012 | Morin et al. | |
| 2012/0274745 A1* | 11/2012 | Russell | 348/46 |
| 2012/0290946 A1* | 11/2012 | Schrock et al. | 715/752 |
| 2012/0310626 A1 | 12/2012 | Kida et al. | |
| 2013/0046544 A1* | 2/2013 | Kay et al. | 704/275 |
| 2013/0074014 A1 | 3/2013 | Ouyang et al. | |
| 2013/0082824 A1 | 4/2013 | Colley | |
| 2013/0120266 A1* | 5/2013 | Griffin et al. | 345/168 |
| 2013/0125034 A1 | 5/2013 | Griffin et al. | |
| 2013/0135209 A1 | 5/2013 | Zhai et al. | |
| 2013/0176228 A1 | 7/2013 | Griffin et al. | |
| 2013/0205242 A1 | 8/2013 | Colby | |
| 2013/0212515 A1 | 8/2013 | Eleftheriou | |
| 2014/0098023 A1 | 4/2014 | Zhai et al. | |
| 2014/0201671 A1 | 7/2014 | Zhai et al. | |

FOREIGN PATENT DOCUMENTS

| | | |
|---|---|---|
| EP | 1860576 A1 | 11/2007 |
| EP | 1887451 A2 | 2/2008 |
| WO | 2004/066075 A2 | 8/2004 |
| WO | 2007017660 A2 | 2/2007 |
| WO | 2008/013658 A2 | 1/2008 |
| WO | 2011113057 A1 | 9/2011 |
| WO | 13107998 A1 | 7/2013 |

OTHER PUBLICATIONS

U.S. Appl. No. 13/249,205, by Gabriel Aaron Cohen, filed Sep. 29, 2011.

Split Keyboard for iPad [Concept], by Skipper Eye, Apr. 23, 2010, found at http://www.redmondpie.com/split-keyboard-for-ipad-9140675/, 6 pp.

Split Keyboard for Thumb Typing Coming to iPad with iOS 5, by Kevin Purcell, Jun. 6, 2011, found at http://www.gottabemobile.com/2011/06/06/split-keyboard-for-thumb-typing-corning-to-ipad-with-ios-5/, 8 pp.

7 Swype keyboard tips for better Swyping, by Ed Rhee, found at http://howto.cnet.com/8301-11310_39-20070627-285/7-swype-keyboard-tips-for-better-swyping/, posted Jun. 14, 2011, 5 pp.

Keymonk—The Future of Smartphone Keyboards, found at www.keymonk.com, downloaded Sep. 5, 2012, 2 pp.

Keymonk Keyboard Free—Android Apps on Google Play, Description, found at https://play.google.com/store/apps/details?id=com.keymonk.latin&hl=en, downloaded Oct. 3, 2012, 2 pp.

Keymonk Keyboard Free—Android Apps on Google Play, User Reviews, found at https://play.google.com/store/apps/details?id=com.keymonk.latin&h1=en, downloaded Oct. 3, 2012, 2 pp.

Keymonk Keyboard Free—Android Apps on Google Play, What's New, found at https://play.google.com/store/apps/ details?id=com.keymonk.latin&h1=en, downloaded Oct. 3, 2012, 2 pp.

Keymonk Keyboard Free—Android Apps on Google Play, Permissions, found at https://play.google.com/store/apps/details?id=com.keymonk.latin&h1=en, downloaded Oct. 3, 2012, 2 pp.

ShapeWriter Keyboard allows you to input on Android the same experience with on PC, Android forums, found at talkandroid.com/.../2767-shapewriter-keyboard-allows-you-input-android-same-experience-pc.html, last updated Oct. 25, 2009, 3 pp.

ShapeWriter vs Swype Keyboard, DroidForums.net, found at www.droidforums.net/forum/droid-applications/48707-shapewriter-vs-swype-keyboard.html, last updated Jun. 1, 2010, 5 pp.

Welcome to CooTek—TouchPal, an innovative soft keyboard, TouchPal v1.0 for Android will Release Soon!, found at www.cootek.com/intro-android.aspx, downloaded Aug. 20, 2012, 2 pp.

Dasur Pattern Recognition Ltd. SlideIT Keyboard—User Guide, Jul. 2011, found at http://www.mobiletextinput.com/App_Open/Manual/SlideIT_UserGuide%BEnglish%5Dv4.0.pdf, 21 pp.

Why your typing sucks on Android, and how to fix it, by Martin Bryant, Mar. 3, 2010, found at thenextweb.com/mobile/2010/03/03/typing-sucks-android-fix/, 3 pp.

Avoid iPhone navigation and typing hassles, by Ted Landau, Dec. 28, 2007, found at www.macworld.com/article/1131264/tco_iphone.html, 9 pp.

Kristensson et al., "Command Strokes with and without Preview: Using Pen Gestures on Keyboard for Command Selection," CHI Proceedings, San Jose, CA, USA, Apr. 28-May 3, 2007, 10 pp.

How to Type Faster with the Swype Keyboard for Android—How-To Geek, found at www.howtogeek.com/106643/how-to-type-faster-with-the-swype-keyboard-for-android/, downloaded Jun. 4, 2012, 13 pp.

Android OS—Language & keyboard settings, found at support.google.com/ics/nexus/bin/answer.py?hl=en&answer=168584, downloaded Jun. 4, 2012, 3 pp.

Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 4, 2012, 2 pp.

Sensory Software—Text Chat, found at www.sensorysoftware.com/textchat.html, downloaded Jun. 4, 2012, 3 pp.

Williamson et al., "Hex: Dynamics and Probabilistic Text Entry," Switching and Learning LNCS 3355, pp. 333-342, 2005.

(56) References Cited

OTHER PUBLICATIONS

Kristensson et al,. "Shark2: A Large Vocabulary Shorthand Writing System for Pen-based Computers," UIST, vol. 6, issue 2, Oct. 24-27, 2004.

Young et al., "Token Passing: a Simple Conceptual Model for Connected Speech Recognition Systems," Cambridge University Engineering Department, Jul. 31, 1989, 23 pp.

ShapeWriter Research Project home page, accessed May 25, 2012, found at http://www.almaden.ibm.com/u/zhai/shapewriter_research.htm, 12 pp.

Office Action from U.S. Appl. No. 13/734,810, dated May 24, 2013, 17 pp.

"Hey Apple, What the Next iPhone Really, Really Needs is a Much Better Keyboard," by Natasha Lomas, downloaded Apr. 22, 2013, from techcrunch.com/2013/04/21/the-iphone-keyboard-stinks/?, 6 pp.

Tappert et al., "The State of the Art in On-Line Handwriting Recognition," IEEE Transactions on Pattern Analysis and Machine Intelligence, vol. 12, No. 8, Aug. 1990, pp. 787-808.

Li et al., "A Fast and Accurate Gesture Recognizer," CHI 2010, Apr. 10-15, 2010, Atlanta, Georgia, pp. 2169-2172.

U.S. Appl. No. 13/734,810, by Yu Ouyang, filed Jan. 24, 2013.

U.S. Appl. No. 60/430,338, by Daniel Suraqui, filed Nov. 29, 2002.

U.S. Appl. No. 60/505,724, by Daniel Suraqui, filed Sep. 22, 2003.

CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17.7829), accessed on Apr. 30, 2012, 2 pp.

Swiftkey 3 Keyboard—Android Apps on Google Play, found at https://play.google.com/store/apps/details?id=com.touchtype.swiftkey&hl=en, accessed on Jun. 8, 2012, 2 pp.

"SwiftKey Counters Swipe with a Smart Version, Makes an In-Road Into Healthcare Market" by Mike Butcher, found at http://techcrunch.com/2012/06/21/swiftkey-counters-swype-with-a-smarter-version-makes-an-in-road-into-healthcare-market/, Jun. 21, 2012, 1 p.

Advanced tips for Swype, found at www.swype.com/tips/advanced-tips/, downloaded Aug. 20, 2012, 3 pp.

Swype—Swype Basics, found at www.swype.com/tips/swype-basics/, downloaded Jun. 8, 2012, 2 pp.

U.S. Appl. No. 13/907,614, by Yu Ouyang, filed May 31, 2013.

Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.

Kane et al., "TrueKeys: Identifying and Correcting Typing Errors for People with Motor Impairments," Proceedings of the 13th International Conference on Intelligent User Interfaces, IUI '08, Jan. 13, 2008, 4 pp.

Karch, "Typing, Copy, and Search," Android Tablets Made Simple, Nov. 18, 2011, 13 pp.

Naseem, "A Hybrid Approach for Urdu Spell Checking," MS Thesis, National University of Computer & Emerging Sciences, retrieved from the internet http://www.cle.org.pk/Publication/theses/2004/a_hybrid_approach_for_Urdu_spell_checking.pdf, Nov. 1, 2004, 87 pp.

"SwiftKey 3 Keyboard—Android Apps on Google Play," found at web.archive.org/web/20121020153209/https://play.google.com/store/apps/details?id=com.touchtype.swiftkey&hl=en, accessed on Oct. 20, 2012, 4 pp.

"SwiftKey 3 Keyboard—Android Apps on Google Play," found at web.archive.org/web/20121127141326/https://play.google.com/store/apps/details?id=com.touchtype.swiftkey&hl=en, accessed on Nov. 27, 2012, 4 pp.

SlideIT Soft Keyboard, SlideIT [online], First accessed on Jan. 31, 2012, retrieved from the Internet: https://play.google.com/store/apps/details?id=com.dasur.slideit.vt.lite&hl=en>, 4 pp.

Swiftkey, "Swiftkey 3 Keyboard" retrieved from https://play.google.com/store/apps/detais, accessed on Jul. 17, 212, 3 pp.

"Swipe Nuance Home, Type Fast, Swipe Faster," found at http://www.swipe.com/, accessed on May 25, 2012, 1 p.

Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.

Wobrock et al., "Gestures without Libraries, Toolkits or Training: A $1 Recognizer for User Inter face Prototypes," UIST 2007, Proceedings of the 20th Annual ACM Symposium on User Interface Software and Technology, Aug. 19, 2007, pp. 159-168.

U.S. Appl. No. 13/592,131, by Shuman Zhai, filed Aug. 22, 2012.

U.S. Appl. No. 13/793,825, by Xiaojun Bi, filed Mar. 11, 2013.

U.S. Appl. No. 13/657,574, by Yu Ouyang, filed Oct. 22, 2012.

U.S. Appl. No. 13/858,684, by Yu Ouyang, filed Apr. 8, 2013.

U.S. Appl. No. 13/787,513, by Shuman Zhai, filed Mar. 6, 2013.

Response to Office Action dated May 24, 2013, from U.S. Appl. No. 13/734,810, filed Aug. 22, 2013, 11 pp.

International Search Report and Written Opinion of International Application No. PCT/US2013/063316, mailed Jan. 3, 2014, 10 pp.

International Search Report and Written Opinion of International Application No. PCT/US2013/063237, mailed Jan. 15, 2014, 10 pp.

Text input for future computing devices (SHARK shorthand and ATOMIK). SHARK Shorthand Home Page, retrieved from http://www.almaden.ibm.com/u/zhai/lopics/virtualkeyboard.htm, accessed on Sep. 20, 2012, 4 pp.

Accot et al., "Refining Fitts' Law Models for Bivariate Pointing," IBM Almaden Research Center, Paper: Pointing and Manipulating, Apr. 5-10, 2003, pp. 193-200.

Bellegarda, Statistical Language Model Adaptation: Review and Perspectives, Speech Communication 42, Jan. 2004, pp. 93-108.

Goodman et al., Language Modeling for Soft Keyboards, Proceedings of the 7th International Conference on Intelligent user interfaces, Jan. 13-16, 2002, pp. 194-195.

Goodman, "A Bit of Progress in Language Modeling Extended Version," Machine Learning and Applied Statistics Group, Microsoft Corporation, Aug. 2001, 73 pp.

Goodman, "A bit of progress In Language Modeling," Computer Speech & Language, Oct. 2001, pp. 403-434.

Gunawardana et al., "Usability Guided Key-Target Resizing for Soft Keyboards," Proceedings of the 15th International Conference on Intelligent user interfaces, Feb. 7-10, 2010, pp. 111-118.

Harb et al., "Back-off Language Model Compression," Google Inc., 2009, 4 pp.

Kristensson et al., "Relaxing Stylus Typing Precision by Geometric Pattern Matching," Proceedings of the loth International Conference on Intelligent User Interfaces, Jan. 9-12,2005, pp. 151-158.

MacKenzie et al., "LetterWise: Prefix-based Disambiguation for Mobile Text Input," Proceedings of the 14th Annual ACM Symposium on User Interface Software and Technology, Nov. 11-14, 2001, pp. 111-120.

Mohri et al., "Speech Recognition With Weighted Finite-State Transducers," Springer Handbook on Speech Processing and Speech Communication, 2008, 31 pp.

Rybach et al., "Silence is Golden: Modeling Non-speech Events In West-Based Dynamic Network Decoders," Human Language Technology and Pattern Recognition, Computer Science Department RWTH Aachen University, Mar. 2012, 4pp.

Youtube, "Automatic error correction on graphical keyboard," Retrieved from http://www.youtube.com/watch? v=_VgYrz7Pi60, Uploaded on Jun. 14, 2007, 1 p.

Youtube, "BlindType-Demo 1 ,"Retrieved from http://www.youtube.com/watch?v=M968NIMd79w, Uploaded on Jul. 17, 2010, 1 p.

Youtube, "BlindType-Demo 2," Retrieved from http://www.youtube.com/watch?v=7gDF4ocLhQM, Uploaded on Aug. 2, 2010, 1 p.

Youtube, "BlindType on Android," Retrieved from http://www.youtube.com/watch?v=m6eKm1gUnTE, Uploaded on Aug. 7, 2010, 1 p.

(56) References Cited

OTHER PUBLICATIONS

Youtube, "BlindType-Thank you!, "Retrieved from http://www.youtube.com/watch?v=KTw4JexFW-o, Uploaded on Jul. 22, 2010, 1 p.

Zhai et al., "In search of effective text input interfaces for off the desktop computing," Interacting with Computers 17, Feb. 20, 2004, pp. 229-250.

Zhai, Shumin, "Text input for future computing devices (SHARK shorthand and ATOMIK)," SHARK Shorthand [online]. Apr. 23, 2012. First Accessed on Jan. 31, 2014. Retrieved from the Internet: <https:l/web.archive.org/web/20120423013658/http://www.almaden.ibm.com/u/zhai/topics/virtualkeyboard.htm>, 3 pp.

* cited by examiner

INCREMENTAL MULTI-TOUCH GESTURE RECOGNITION

BACKGROUND

Computing devices (e.g., mobile phones, tablet computers, and the like) may provide a graphical keyboard at a presence-sensitive screen to facilitate text entry. For instance, a computing device may provide a graphical keyboard that allows the user to enter data by tapping regions of the presence-sensitive screen that are associated with keys of the graphical keyboard.

Such keyboards may suffer from limitations in accuracy, speed, and/or inability to adapt to the user. In certain cases, these keyboards may require text input from the user that is tedious, slow, and/or error prone for longer words. Newer computing devices may provide graphical keyboards that allow a user to input text by performing a gesture that uses multiple fingers.

SUMMARY

In one example, a method comprises outputting, by a computing device and for display at an output device, a graphical keyboard comprising a plurality of keys, and receiving, by the computing device, an indication of a multi-touch gesture detected at a presence-sensitive display, the multi-touch gesture comprising a first sub-gesture that traverses a first group of keys of the plurality of keys and a second sub-gesture that traverses a second group of keys of the plurality of keys. The example method further comprises determining, by the computing device and in response to detecting the first sub-gesture and the second sub-gesture, a candidate word based at least in part on the first and second groups of keys, wherein the determining comprises: determining, by the computing device and based at least in part on the first sub-gesture, a first group of points traversed by the first sub-gesture; determining, by the computing device and based at least in part on the second sub-gesture, a second group of points traversed by the second sub-gesture; determining, by the computing device and based at least in part on the first and second groups of points, at least one probability that at least one key included in at least one of the first and second groups of keys is associated with at least one of the first sub-gesture and the second sub-gesture; and determining, by the computing device, the candidate word based at least in part on the at least one probability that the at least one key is associated with at least one of the first sub-gesture and the second sub-gesture. The example method further comprises outputting, by the computing device and for display at the output device, the candidate word.

In one example, a computing device comprises at least one processor. The at least one processor is configured to output, for display at an output device, a graphical keyboard comprising a plurality of keys, to receive an indication of a multi-touch gesture detected at a presence-sensitive display, the multi-touch gesture comprising a first sub-gesture that traverses a first group of keys of the plurality of keys and a second sub-gesture that traverses a second group of keys of the plurality of keys, and to determine, in response to detecting the first sub-gesture and the second sub-gesture, a candidate word based at least in part on the first and second groups of keys. The determining comprises: determining, based at least in part on the first sub-gesture, a first group of points traversed by the first sub-gesture; determining, based at least in part on the second sub-gesture, a second group of points traversed by the second sub-gesture; determining, based at least in part on the first and second groups of points, at least one probability that at least one key included in at least one of the first and second groups of keys is associated with at least one of the first sub-gesture and the second sub-gesture; and determining the candidate word based at least in part on the at least one probability that the at least one key is associated with at least one of the first sub-gesture and the second sub-gesture. The at least one processor is further configured to output, for display at the output device, the candidate word.

In one example, a computer-readable storage medium encoded with instructions that, when executed, cause at least one processor to output, for display at an output device, a graphical keyboard comprising a plurality of keys, to receive an indication of a multi-touch gesture detected at a presence-sensitive display, the multi-touch gesture comprising a first sub-gesture that traverses a first group of keys of the plurality of keys and a second sub-gesture that traverses a second group of keys of the plurality of keys, and to determine, in response to detecting the first sub-gesture and the second sub-gesture, a candidate word based at least in part on the first and second groups of keys. The determining comprises: determining, based at least in part on the first sub-gesture, a first group of points traversed by the first sub-gesture; determining, based at least in part on the second sub-gesture, a second group of points traversed by the second sub-gesture; determining, based at least in part on the first and second groups of points, at least one probability that at least one key included in at least one of the first and second groups of keys is associated with at least one of the first sub-gesture and the second sub-gesture; and determining the candidate word based at least in part on the at least one probability that the at least one key is associated with at least one of the first sub-gesture and the second sub-gesture. The computer-readable storage medium further encoded with instructions that, when executed, cause the at least one processor to output, for display at the output device, the candidate word.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques for incrementally determining one or more candidate words based on a detected multi-touch gesture (e.g., bi-manual gesture) to select one or more groups of keys that are included in a gesture-based, graphical keyboard. In some examples, a presence-sensitive display device is capable of detecting user input in the form of multiple sub-gestures of a multi-touch gesture performed at or near the presence-sensitive display. Techniques of the present disclosure may improve the speed and accuracy at which a computing device is able to select candidate words based upon such user input to select keys included in the graphical keyboard that is displayed at an output device.

For instance, using one or more techniques of this disclosure, a computing device may incrementally, and in real-time, determine one or more candidate words indicated by a multi-touch gesture performed by a user. By incrementally determining a candidate word as the gesture is performed, the computing device may output the candidate word with potentially reduced post-gesture entry processing time. To determine candidate words, the computing device may incrementally determine one or more points of each sub-gesture of the multi-touch gesture that align with a given position of a key included in the graphical keyboard.

Based on this determination, the computing device may construct one or more probable interpretations for each sub-gesture of the multi-touch gesture by traversing both the respective sub-gesture and various states in a lexicon (e.g., dictionary). In this way, certain techniques of the disclosure allow a computing device to incrementally match the multi-touch gesture to words in a lexicon trie, one node/letter at a time, using a gesture model. In some examples, techniques of the disclosure may allow a computing device to use one or more spatial and/or temporal alignment features to improve the accuracy of the incremental determinations for predicting candidate words and/or performing auto-completion functionality as a user provides input to enter text.

Figure 1:
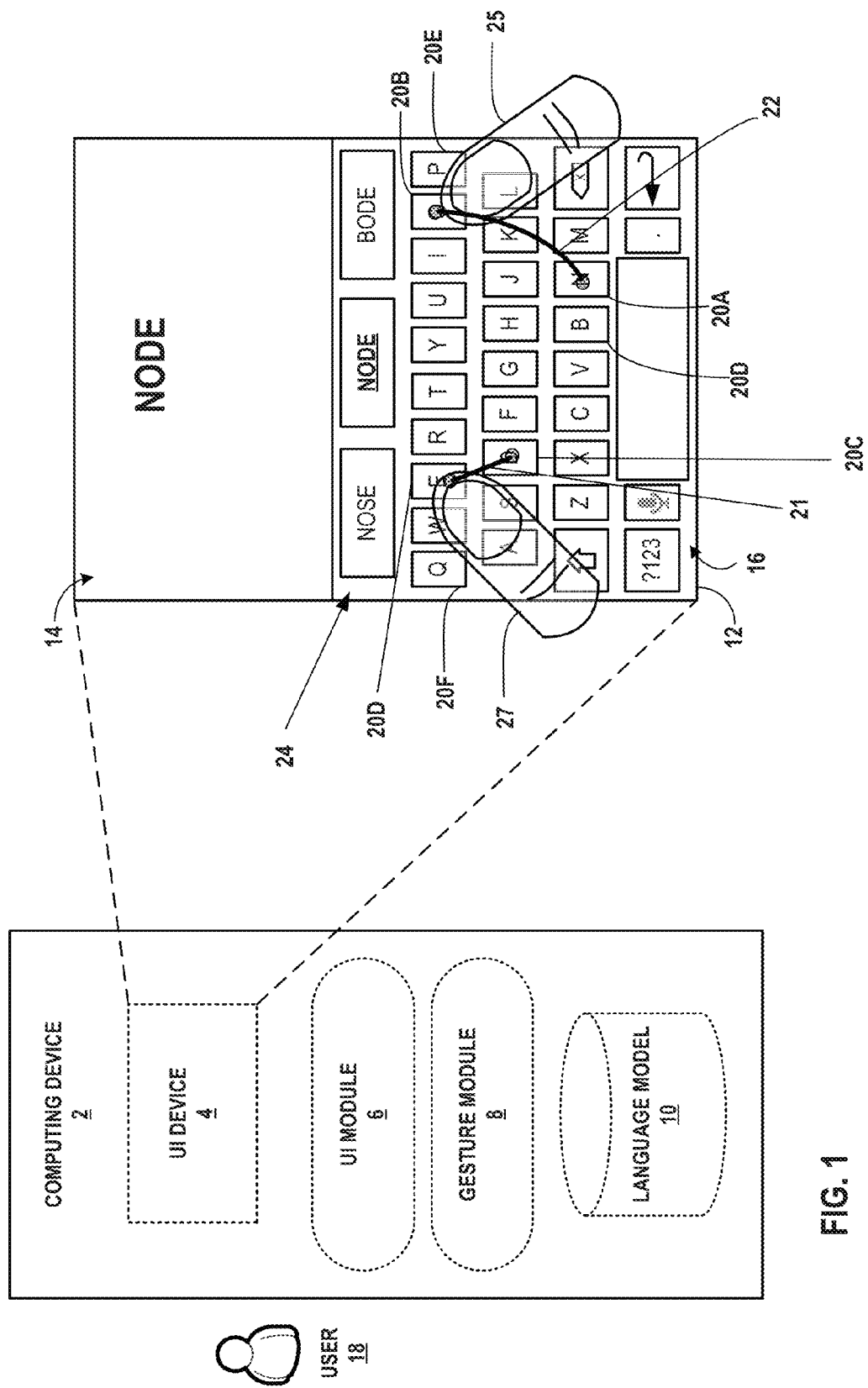
FIG. 1 is a conceptual diagram illustrating an example computing device that may be used to incrementally determine text from a multi-touch gesture, in accordance with one or more techniques of the present disclosure.

FIG. 1 is a conceptual diagram illustrating an example computing device 2 that may be used to incrementally determine text from a multi-touch gesture, in accordance with one or more techniques of the present disclosure. In some examples, computing device 2 may be associated with a user 18.

Examples of computing device 2 may include, but are not limited to, portable or mobile devices such as mobile phones (including smart phones), laptop computers, desktop computers, tablet computers, smart television platforms, cameras, personal digital assistants (PDA's), and the like. As shown in the example of FIG. 1, computing device 2 may be a tablet computer. Computing device 2, in some examples can include a user interface (UI) device 4, a UI module 6, a gesture module 8, and a language model 10. Other examples of computing device 2 that implement techniques of this disclosure may include additional components not shown in FIG. 1. As shown in the non-limiting example of FIG. 1, UI device 4, UI module 6, gesture module 8, and language model 10 are shown as being optionally included, stored, or otherwise implemented in computing device 2. In some examples, however, one or more of UI device 4, UI module 6, gesture module 8, and language model 10 may be included, stored, or otherwise implemented in one or more devices that are separate and distinct from computing device 2. In these examples, the one or more devices that are separate and distinct from computing device 2 are coupled (physically, communicatively, and/or operatively) to computing device 2.

In some examples, UI device 4 is configured to receive tactile, audio, or visual input. UI device 4, as shown in FIG. 1, may include a presence-sensitive display or any other type of device for receiving input. UI device 4 may output content such as graphical user interface (GUI) 12 for display. In the example of FIG. 1, UI device 4 may be a presence-sensitive display that can receive input from user 18 using capacitive, inductive, and/or optical detection at or near the presence-sensitive display.

As shown in FIG. 1, computing device 2 may include UI module 6. UI module 6 may perform one or more functions to receive input, such as user input or network data, and send such input to other components associated with computing device 2, such as gesture module 8. For example, UI module 6 may determine a gesture performed by user 18 at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information in text-entry area 14 of GUI 12. In some examples, UI device 4 provides the combined functionality of both an input and output device. In some examples, UI device 4 includes separate and distinct input and output devices. In some examples, computing device 2 is operatively coupled to input and/or output devices that are external to computing device 2 but provide functionality similar to that of UI device 4.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform any variety of operations on computing device 2. For instance, gesture module 8 may include functionality to incrementally determine text from a multi-touch gesture that comprises multiple sub-gestures in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gesture data. Gesture module 8 may also send data to components associated with computing device 2, such as UI module 6. For instance, gesture module 8 may send text determined from the gesture data to UI module 6 that causes UI device 4 to display GUI 10.

As shown in FIG. 1, GUI 12 may be a user interface generated by UI module 6 that allows user 18 to interact with computing device 2. GUI 12 may include graphical content. Graphical content, generally speaking, may include text, images, a group of moving images, and the like. As shown in FIG. 1, graphical content may include gesture-based, graphical keyboard 16, text-entry area 14, and word suggestion area 24. Graphical keyboard 16 may include a plurality of keys, such as "N" key 20A, "O" key 20B, "D" key 20C, and "E" key 20D. In some examples, each of the plurality of keys included in graphical keyboard 16 represents a single character. In other examples, one or more of the plurality of keys included in graphical keyboard 16 represents a group of characters selected based on a plurality of modes.

In some examples, text-entry area 14 may include characters or other graphical content that are included in, for example, a text-message, a document, an e-mail message, a web browser, or any other situation where text entry is desired. For instance, text-entry area 14 may include characters or other graphical content that are selected by user 18 via gestures performed at UI device 4. In some examples, word suggestion area 24 may display one or more suggested, or candidate, words. UI module 6 may cause UI device 4 to display graphical keyboard 16 and detect a multi-touch gesture having a first gesture path 22, associated with a sub-gesture performed by user 18's first finger 25, which is incrementally determined by gesture module 8 in accordance with techniques of the present disclosure further described herein. UI module 6 may detect a second gesture path 21, associated with a second sub-gesture performed by user 18's second finger 27, which may also be incrementally determined by gesture module 8. Additionally, UI module 6 may cause UI device 4 to display one or more candidate words determined from the sub-gestures of the multi-touch gesture in word suggestion area 24.

In general, user 18 may perform a multi-touch gesture utilizing multiple fingers 25 and 27. Each finger 25, 27 may perform a sub-gesture of the multi-touch gesture, and either sub-gesture may comprise one or more segments or paths, as described in more detail below. Furthermore, each sub-gesture may comprise a swipe gesture or a tap gesture, according to certain examples. Fingers 25 and 27 may be included on separate hands of user 18, in which case the multi-touch gesture may comprise a bi-manual gesture. In other cases, fingers 25 and 27 may be included on a single hand of user 18. UI module 6 may receive an indication of the multi-touch gesture detected at the presence-sensitive display. A sub-gesture associated with finger 25 of the multi-touch gesture may traverse a first group of keys of a plurality of keys of keyboard 16, and a sub-gesture associated with finger 27 may traverse a second group of keys of the plurality of keys.

Computing device 2, in some examples, includes language model 10. Language model 10 may include a lexicon. In some examples, a lexicon may include a listing of words and may include additional information about the listed words. A lexicon may be represented by a range of data structures, such as an array, a list, and/or a tree. For example, language model 10 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices and are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter or word) in a contiguous sequence of items based on the previous items in the sequence (e.g., $P(x_i|x_{i-(n-1)}, \ldots, x_{i-1})$). For instance, a bigram language model (an n-gram model where n=2) may provide a probability that the letter "D" follows the sequence "NO." In some examples, language model 10 includes a lexicon trie with integrated language model frequency information. For instance, each node of the lexicon trie may include a representation of a letter and a probability value.

Techniques of the present disclosure may improve the speed and accuracy with which a user can enter text into a computing device. Using techniques of this disclosure, a user may, instead of performing a discrete gesture for each keys of a word, perform a single multi-touch gesture that indicates the word. As noted above, the multi-touch gesture comprises multiple sub-gestures each of which may be performed, either sequentially or simultaneously, by user 18's fingers 25 and 27. In various examples, the techniques of the disclosure allow user 18 to lift up and move either finger 25, 27 mid gesture while the other finger maintains interaction (e.g., touch, presence) with UI device 4. For instance, user 18 may perform a swipe gesture with one finger 25, 27 while performing a tap gesture with the other. In general, user 18 may use fingers 25 and 27 to perform various different forms of sub-gestures, such as swipe and tap gesture, to select different keys of keyboard 16.

As user 18 uses fingers 25 and 27 to perform each sub-gesture of the multi-touch gesture, computing device 2 may incrementally determine the candidate word indicated by the gesture. By incrementally decoding the multi-touch gesture as it is being performed, user 18 is presented with a candidate word in suggestion area 24 with potentially minimal post-gesture entry processing time. Moreover, by enabling user 18 to enter a word with a multi-touch gesture using both fingers 25 and 27 either sequentially or simultaneously, techniques of this disclosure enable user 18 to potentially increase the rate at which text is entered. Techniques of the disclosure are now further described herein with respect to components of FIG. 1.

As shown in the example of FIG. 1, UI module 6 may cause UI device 4 to display GUI 12. User 18 may desire to enter text, for example the word "NODE" into text-entry area 14. User 18, in accordance with the techniques of this disclosure, may perform a multi-touch gesture at gesture-based, graphical keyboard 16. In one example, the multi-touch gesture may be one or more continuous movements in which user 18's fingers 25, 27 move into proximity with UI device 4 such that the multi-touch gesture is detected by UI device 4 throughout the performance a sub-gesture of finger 25 and a sub-gesture of finger 27 of the multi-touch gesture. In a different example, user 18 may move his/her fingers 25, 27 into proximity with UI device 4 such that fingers 25, 27 are temporarily detected by UI device 4 and then user 18's fingers 25, 27 move away from UI device 4 and are no longer detected.

While user 18 performs the multi-touch gesture to select a group of keys of the plurality of keys in keyboard 16, UI module 6 may detect a sub-gesture of finger 25 having gesture path 22 at the presence-sensitive display. As shown in FIG. 1, user 18 performs the sub-gesture of finger 25 by tracing gesture path 22 through or near keys of keyboard 16 that correspond to the characters of the desired word (i.e., the characters represented by "N" key 20A and "O" key 20B). UI module 6 may send data that indicates gesture path 22 to gesture module 8. In some examples, UI module 6 incrementally send data indicating gesture path 22 to gesture module 8 as gesture path 22 is detected by UI device 4 and received by UI module 6. For instance, UI module 6 may send a stream of coordinate pairs indicating gesture path 22 to gesture module 8 as gesture path 22 is detected by UI device 4 and received by UI module 6.

Similarly, UI module 6 may detect a second sub-gesture of finger 27 having gesture path 21 at the presence-sensitive display. As shown in FIG. 1, user 18 performs the sub-gesture of finger 27 by tracing gesture path 21 through or near keys of keyboard 16 that correspond to the characters of the desired word (i.e., the characters represented by "D" key 20C and "E" key 20D). UI module 6 may send data that indicates gesture path 21 to gesture module 8. In some examples, UI module 6 incrementally sends data indicating gesture path 21 to gesture module 8 as gesture path 21 is detected by UI device 4 and received by UI module 6.

In response to receiving data that represents gesture path1 21 and 22 from UI module 6, gesture module 8 may determine a candidate word. A candidate word may be a word suggested to user 18 that is composed of a group of keys indicated by gesture paths 21 and 22. The group of keys may be determined based on gesture paths 21 and 22 and a lexicon/language model, such as language model 10. Gesture module 8 may, in some examples, determine a candidate word by determining a group of alignment points traversed by gesture paths 21 and 22, determining a respective cost value for each of at least two keys of the plurality of keys, and comparing the respective cost values for the at least two keys to determine a combination of keys having a combined cost value that satisfies a threshold, as further described below. Each of the respective cost values may represent a probability that a point of the first group of points or the second group of points indicates the corresponding key of the at least two keys. In some examples, determining the respective cost value for each of the at least two keys includes determining a respective lexical cost value for each of the at least two keys, wherein each of the respective lexical cost values represents a probability that a letter represented by the corresponding key of the at least two keys is included in the candidate word, and wherein determining the respective lexical cost value for each of the at least two keys comprises comparing each of the at least two keys with a lexicon/language model, such as language model 10. Gesture module 8 may, in some examples, only identify characters or letters associated with keys that form valid words according to the lexicon/language model.

An alignment point is a point along gesture path 21 or 22 that may indicate a key of the plurality of keys. An alignment point may include one or more coordinates corresponding to the determined position of the alignment point. For instance, an alignment point may include Cartesian coordinates corresponding to a point on GUI 12.

In some examples, gesture module 8 determines the group of alignment points traversed by gesture paths 21 and 22 based on a plurality of features associated with gesture paths 21 and 22 when, for instance, implementing an optional spatial model. The plurality of features associated with gesture paths 21 or 22 may include a length of a segment of the gesture path. For instance, gesture module 8 may determine the length along the gesture segment from a previous alignment point and the current alignment point. For better alignments, the length will more closely approximate the straight-line distance between to two corresponding keyboard letters.

In another example, gesture module 8 may determine a direction of a segment from a first point to a second point of gesture path 21 or 22 to determine the group of alignment points. For better alignments, the direction of the segment will more closely approximate the direction of a straight line from between two corresponding keyboard letters.

In some examples, a curvature of a segment of gesture path 21 or 22, a local speed representing a rate at which a segment of the gesture was detected, and a global speed representing a rate at which the gesture path was detected may also be accounted for by gesture module 8. If gesture module 8 determines a slower speed or pause for the local speed, gesture module 8 may determine that a point at the segment is more likely to be an alignment point. If gesture module 8 determines that a gesture was drawn quickly, the gesture module 8 may determine the gesture is more likely to be imprecise and therefore gesture module 8 may increase the weight on the language module (i.e., n-gram frequencies) than the spatial model.

In one example, gesture module 8 may determine an alignment point of the group of alignment points based on a segment of gesture path 21 22 having a high curvature value. Additionally, gesture module 8 may determine an alignment point of the group of alignment points based on a segment of gesture path 21 or 22 having a low local speed (e.g., user 18's finger 25 or 27 slowed down while performing the segment of the sub-gesture). In the example of FIG. 1, gesture module 8 may determine a first alignment point at the start of gesture path 22, a second alignment point at the point where gesture path 22 experiences a significant change in curvature, and a third alignment point at the end of gesture path 22. In still other examples, techniques of the disclosure can identify a shape of the sub-gesture as a feature and determine an alignment point based on the shape of the sub-gesture.

In some examples, gesture module 8 may determine respective cost values for each of at least two keys of the plurality of keys included in keyboard 16. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

In some examples, the respective cost values may be based on language model 10. For instance, the respective cost values may be based on the probability that a second key will be selected after a first key (e.g., the probability that the "O" key will be selected after the "N" key). In some examples, the keys for which respective cost values are determined are selected based at least in part on language model 10. In some examples, the cost values are lower where there is a greater likelihood that an alignment point indicates a key. In other examples, the cost values are higher where there is a greater likelihood that an alignment point indicates a key.

In the example of FIG. 1, gesture module 8 may determine, for the sub-gesture associated with finger 25, a first cost value representing a probability that the first alignment point indicates "N" key 20A and a second cost value representing a probability that the first alignment point indicates "B" key 20D. Similarly, gesture module 8 may determine a third cost value representing a probability that the second alignment point indicates "O" key 20B and a fourth cost value representing a probability that the second alignment point indicates "P" key 20E. In a similar fashion, gesture module 8 may determine cost values associated with the sub-gesture associated with finger 27.

Gesture module 8 may compare the respective cost values for at least two keys of the plurality of keys to determine a combination of keys having a combined cost value. A combined cost value may represent a probability that gesture path 22, for example, indicates a combination of keys. Gesture module 8 may compare the respective cost values for at least two keys of the plurality of keys to determine which of the at least two keys is indicated by an alignment point. Gesture module 8 may determine a combination of keys by determining which keys are indicated by each alignment point. In some examples, gesture module 8 determines which of the at least two keys is indicated by an alignment point without regard to which keys are indicated by other alignment points. In other examples, gesture module 8 determines which of the at least two keys is indicated by the alignment point based on which keys are indicated by other alignment points. In such examples, gesture module 8 may revise the determination of which key is indicated by a previous alignment point based on the respective cost values for a current alignment point.

In some examples, gesture module 8 may compare the combined cost value of a determined combination of keys with a threshold value. In some examples, the threshold value is the combined cost value of a different determined combination of keys. For instance, gesture module 8 may determine a first combination of keys having a first combined cost value and a second combination of keys having a second combined cost value. In such an instance, gesture module 8 may determine that the candidate word is based on the combination of keys with the lower combined cost value. In the example of FIG. 1, gesture module 8 may compare the determined respective cost values associated with the sub-gesture of finger 25 to determine a combination of keys (e.g., "N" and "O") having a combined cost value. Similarly, gesture module 8 may compare the determined respective cost values associated with the sub-gesture of finger 27 to determine a combination of keys (e.g., "D" and "E") having a combined cost value.

In some examples, gesture module 8 begins to determine a candidate word prior to the time in which UI device 4 completes detecting gesture path 21 and 22. In the example of FIG. 1, rather than determining the candidate word after UI device 4 completes detecting gesture paths 21 and 22, gesture module 8 may determine a plurality of words as gesture path 22 is detected, such as "NO," "NOT," and "NOW" (to name only a few examples). Additionally, in the example of FIG. 1, gesture module 8 may contemporaneously revise the determined plurality of words as gesture path 21 is detected, such as revision "NO" to "NOD." Furthermore, rather than determining the candidate word based on a geometric shape of the sub-gestures, techniques of the disclosure may determine a candidate word based on a group of characters indicated by the gesture. Gesture module 8 may send the determined word to UI module 6 which may then cause UI device 4 to display the word "NODE" in text-entry area 14 of GUI 12.

In some examples, gesture module 8 utilizes language model 10 to determine, in response to UI module 6 detecting a first sub-gesture associated with finger 25 and a second sub-gesture associated with finger 27, a candidate word (e.g., "NODE" in FIG. 1) based at least in part on a first group of keys traversed by the first sub-gesture and a second group of keys traversed by the second sub-gesture. (Throughout the present application, the use of "first" and "second" in the terms "first sub-gesture" and "second sub-gesture" are provided only to distinguish the two sub-gestures from one another. The use of "first" and "second" in these terms is in no way intended to require, unless otherwise stated, that the "first sub-gesture" is performed prior to performance of the "second sub-gesture." Indeed, as outlined throughout the present application, user 18 may perform these sub-gestures substantially at the same time or sequentially depending on the various different use cases.)

To determine the candidate word, gesture module 8 may determine, based at least in part on the first sub-gesture of finger 25 (e.g., based at least in part on one feature of the first sub-gesture such as length of a segment, direction of movement associated with the segment, curvature of the segment, local speed/global speed, as indicated in examples above), a first group of points traversed by the first sub-gesture of finger 25. Gesture module 8 may further determine, based at least in part on the second sub-gesture of finger 27, a second group of points traversed by the second sub-gesture of finger 27. Gesture module 8 is capable of determining, based at least in part on the first and second groups of points, at least one probability that at least one key included in at least one of the first and second groups of keys is associated with at least one of the first sub-gesture and the second sub-gesture. Gesture module 8 may then determine the candidate word (e.g., "NODE" in FIG. 1) based at least in part on the at least one probability that the at least one key is associated with at least one of the first sub-gesture and the second sub-gesture. In some examples, gesture module 8 may determine the at least one probability that at least one key is associated with at least one of the first sub-gesture and the second sub-gesture by at least determining the at least one probability further based at least in part of one or more words included in a defined lexicon/language model, such as language model 10. Words that are more probable and/or have higher candidate scores in view of the lexicon/language model may be weighted and ranked higher by gesture module 8, and may be displayed more prominently to user 18 in suggestion area 24.

In some examples, gesture module 8 may determine the at least one probability that the at least one key included in the at least one of the first and second groups of keys is associated with the first sub-gesture (finger 25) or the second sub-gesture (finger 27) at least by determining a first probability that the at least one key is included in the first group of keys associated with the first sub-gesture. Gesture module 8 may further determine a second probability that the at least one key is included in the second group of keys associated with the second sub-gesture. If the first probability is greater than the second probability, gesture module 8 determines that the at least one key is included in the first group of keys. If, however, the second probability is greater than the first probability, gesture module 8 determines that the at least one key is included in the second group of keys.

For example, gesture module 8 may determine that there is a first probability that "N" key 20A is included in a group of keys associated with the first sub-gesture of finger 25, and may determine that there is a second probability that "N" key 20A is included in a group of keys associated with the second sub-gesture of finger 27. If the first probability is higher than the second probability, gesture module 8 determines, as is the case in FIG. 1, that "N" key 20A is included in the group of keys associated with the first sub-gesture of finger 25. Gesture module 8 may use similar calculations to determine that "O" key 20B is associated with the sub-gesture of finger 25, and that "D" key 20C and "E" key 20D are associated with the sub-gesture of finger 27.

In some examples, gesture module 8 may determine the probability that a given key in keyboard 16 is included in a group of keys associated with the sub-gesture based at least in part one or more features similar to those outlined above for associating alignment points traversed by finger 25 or 27 to a key on keyboard 16. For example, gesture module 8 may determine a probability that a given key is associated with the sub-gesture of finger 25 based on one or more of the following features: a length of a segment associated with the sub-gesture of finger 25, wherein the segment comprises a path traversed by the sub-gesture of finger 25; a direction of movement associated with the segment of the sub-gesture of finger 25; a curvature of the segment of the sub-gesture of finger 25; a local speed that represents a rate at which the segment of the sub-gesture of finger 25 is detected; a global speed that represents a rate at which the sub-gesture of finger 25 is detected; and a distance (such as a Euclidian distance) between one point of the first group of points and a region that is associated with at least a portion (e.g., center region) of the at least one key.

Similarly, gesture module 8 may determine a probability that a given key is associated with the sub-gesture of finger 27 based on one or more of the following features: a length of a segment associated with the sub-gesture of finger 27, wherein the segment comprises a path traversed by the sub-gesture of finger 27; a direction of movement associated with the segment of the sub-gesture of finger 27; a curvature of the segment of the sub-gesture of finger 27; a local speed that represents a rate at which the segment of the sub-gesture of finger 27 is detected; and a global speed that represents a rate at which the sub-gesture of finger 27 is detected.

In some examples, gesture module 8 may determine respective cost values for each of at least two keys included in at least one of the first and second groups of keys associated with the sub-gestures of fingers 25 and 27, respectively, wherein each of the respective cost values represents a probability that a point of the first group of points traversed by the sub-gesture of finger 25 or the second group of points traversed by the sub-gesture of finger 27 indicates a key included in the first or second groups of keys. Gesture module 8 compares the respective cost values for at least two keys to determine a combination of keys having a combined cost value that, in some cases, satisfies a threshold, as described in further detail below.

In some alternative embodiments, a user can pause when gesturing for a specified time duration at a key to indicate that the key should be included in the gesture path. In another alternative embodiment, rather than using a trie based search as described using techniques of the disclosure, gesture module 8 may maintain a separate gesture-specific word list or dictionary.

In some examples, techniques of the disclosure provide for efficient performance on computing devices, for instance, recognizing gestures in fewer than 100 milliseconds in some cases. Techniques of the disclosure may also use the default dictionary installed on the mobile device rather than using a dedicated gesture dictionary that may be maintained separately and use additional storage resources. In this way, techniques of the disclosure may reduce storage requirements by using a dictionary that is already stored by a default input entry system. Moreover, the dictionary may be implemented efficiently as a compact lexicon trie. Using a default dictionary already provided on a computing device also provides ready support foreign languages, contact names, and user added words in accordance with techniques of the disclosure. By using, e.g., a lexicon trie and the default dictionary, techniques of the disclosure may integrate the language model frequencies (i.e., n-gram probabilities) into the gesture interpretation, thereby allowing the search techniques to concentrate on the potentially promising paths for candidate words based on both the shape of each sub-gesture of the multi-touch and the probability of the word being considered.

By enabling user 18 to enter a word with a multi-touch gesture comprising sub-gestures and performing incremental determinations to identify candidate words, one or more techniques of this disclosure may further enable user 18 to increase the rate at which text is entered. One or more techniques of the present disclosure provide continuous, real-time, in-gesture prediction feedback for multi-finger gestures. Computing device 2 may, in some instances, display a constantly updating prediction for the current gesture above the user 18's finger for one of the respective sub-gestures as user 18 is drawing. This feedback may potentially provide user 18 with more confidence with respect to the gesture recognition process and shows user 18 when the intended word is recognized correctly.

According to one or more techniques of the present disclosure, when detecting character input based upon multi-touch gesture input from user 18, gesture module 8 is capable of determining to which stroke, or sub-gesture of the multi-touch gesture input, each letter of the word should be aligned or associated. For example, in FIG. 1, computing device 2 is capable of determining (e.g., using gesture module 8) that the letters "N" and "O" should be aligned to the right-hand sub-gesture, input via finger 25, while the letters "D" and "E" should be aligned to the left-hand sub-gesture, via finger 27. This process may happen incrementally as gesture module 8 processes each letter in the candidate word, assigning each letter to the path that results in the best alignment score, taking into account a number of spatial features, in some examples, such as distance, direction, straightness, and other features associated with gesture paths 21 and 22 of the respective sub-gestures. Gesture module 8 is capable of tracking the movement of each sub-gesture independently as fingers 25 and 27 slide across the keys keyboard 16 to map out the letters in the candidate word. Each sub-gesture can draw any part of the word, and user 18 can move both fingers 25 and 27 simultaneously or sequentially. In some examples, the candidate word (e.g., "NODE" in FIG. 1) is committed once both fingers 25 and 27 are lifted from keyboard 16 and away from UI device 4. In other examples, the candidate word is not committed until user 18 takes further action (e.g., uses one of fingers 25 or 27 to interact with another key of keyboard 16, such as the space bar, or manually select the suggested candidate word in suggestion area 24).

Because computing device 2 is capable of recognizing a multi-touch gesture incrementally, computing device 2 is capable of storing and updating the prediction as user 18 proceeds with the multi-touch gesture. As a result, the performance of the algorithm is time and memory efficient and does not necessarily degrade even for very long multi-touch gestures that select multiple keys. Further, the algorithm enables the real-time continuous updating of the prediction preview and floating preview (shown in FIGS. 4-7).

Figure 6:
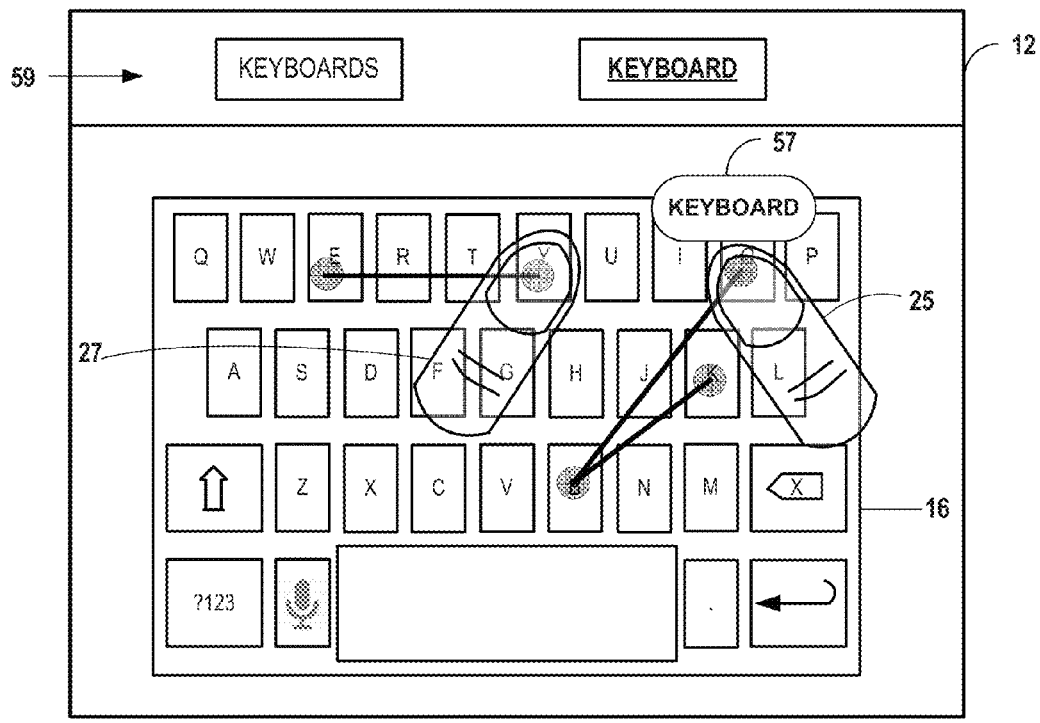
Figure 7:
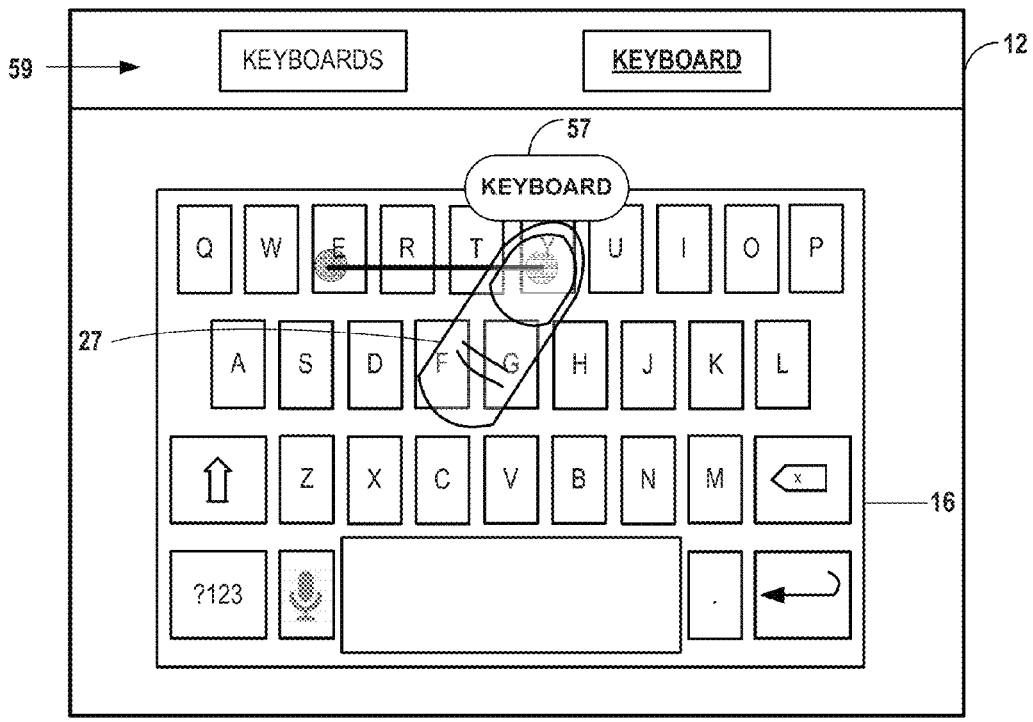

One or more techniques of the present disclosure may also provide implementation of partial gesture auto-completion for multi-touch gestures. As a result, user 18 does not necessarily need to input all letters of a word via multi-touch input. After receiving input to select only the first few letters, gesture module 8 is capable of predicting a likely auto-completion (e.g., auto-completing "ACKN" to "ACKNOWL-EDGE"). Examples of such functionality are shown in FIGS. 6 and 7. At this point, user 18 can, in some examples, simply lift up his/her fingers from UI device 4 to commit the auto-completed word. Furthermore, one or more techniques of the present disclosure utilize the dictionary lexicon trie data structure. The incremental recognition may employ a lexicon-trie based search algorithm to predict the top words candidates for a given multi-touch gesture input. These techniques may be fully compatible with existing on-device dictionaries (including foreign languages, contact names, and the like), and do not necessarily incur any additional storage costs.

Figure 2:
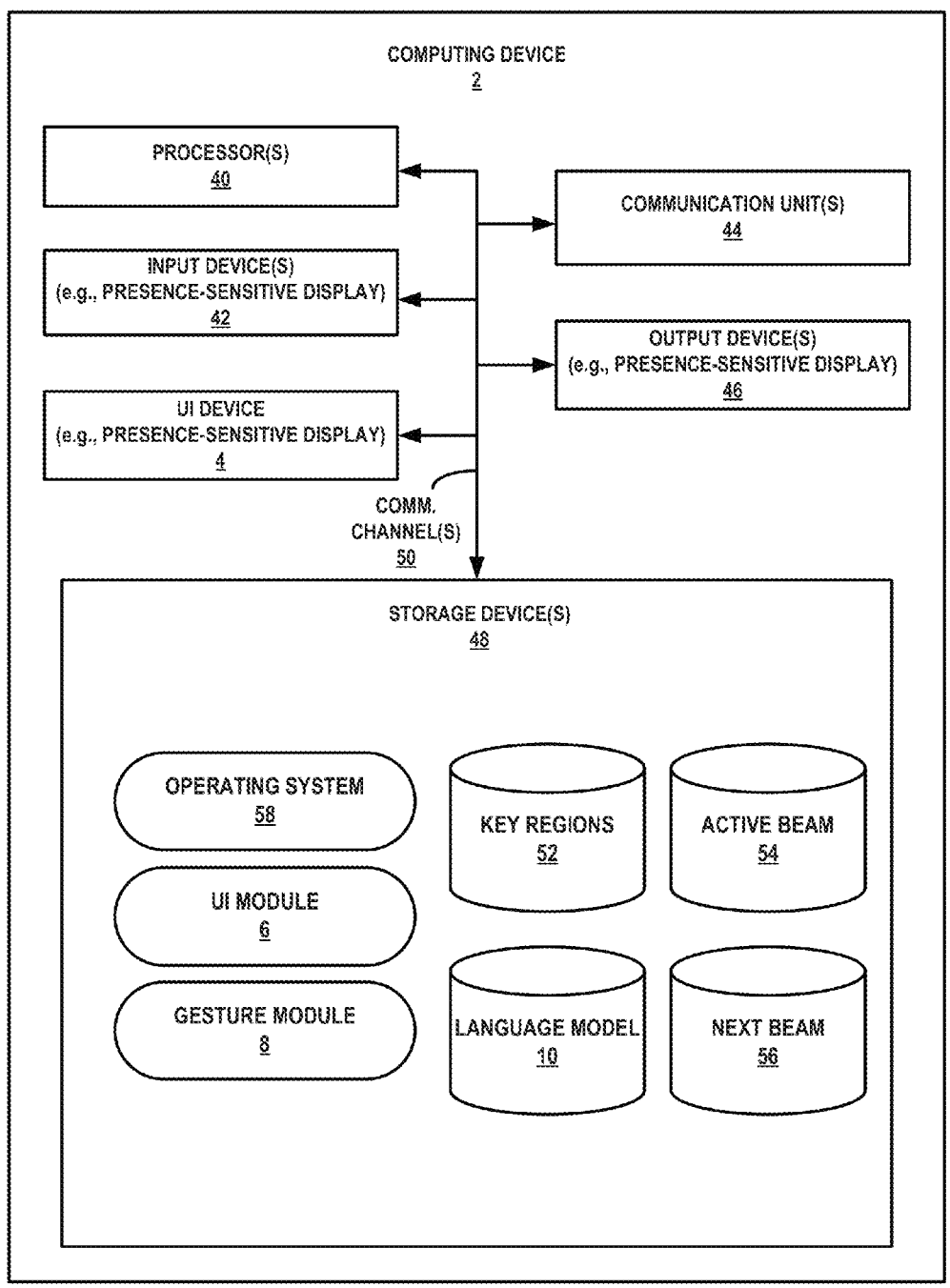
FIG. 2 is a block diagram illustrating further details of one example of the computing device shown in FIG. 1, in accordance with one or more techniques of the present disclosure.

FIG. 2 is a block diagram illustrating further details of one example of a computing device shown in FIG. 1, in accordance with one or more techniques of the present disclosure. FIG. 2 illustrates only one particular example of computing device 2 as shown in FIG. 1, and many other examples of computing device 2 may be used in other instances. Although shown in FIGS. 1 and 2 as a stand-alone computing device for purposes of example, computing device 2 may be any component or system that includes one or more processors (e.g., one or more processors 40) or other suitable computing environment for executing software instructions and, for example, need not necessarily include one or more of the elements shown in these figures (e.g., UI device 4, input devices 42, output devices 46).

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example, further includes UI module 6, gesture module 8, and operating system 58 that are executable by computing device 2. Computing device 2, in one example, further includes language model 10, key regions 52, active beam 54, and next beam 56. Each of components 4, 40, 42, 44, 46, and 48 are coupled (physically, communicatively, and/or operatively) for inter-component communications. As one example in FIG. 2, components 4, 40, 42, 44, 46, and 48 may be coupled by one or more communication channels 50. In some examples, communication channels 50 may include a system bus, a network connection, an inter-process communication data structure, or any other method for communicating data. UI module 6 and gesture module 8 may also communicate information with one another as well as with other components in computing device 2, such as language model 10, key regions 52, active beam 54, and next beam 56.

In the non-limiting example of FIG. 2, input devices 42, output devices 46, UI device 4, UI module 6, gesture module 8, language model 10, key regions 52, active beam 54, and next beam 56 are shown to be included, stored, or otherwise implemented computing device 2. In some examples, however, one or more of input devices 42, output devices 46, UI device 4, UI module 6, gesture module 8, language model 10, key regions 52, active beam 54, and next beam 56 may be included, stored, or otherwise implemented in one or more devices that are separate and distinct from computing device 2. In these examples, the one or more devices that are separate and distinct from computing device 2 are coupled (physically, communicatively, and/or operatively) to computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage devices 48, in some examples, are described as one or more computer-readable storage medium. In some examples, storage devices 48 may comprise temporary memory, meaning that a primary purpose of storage devices 48 is not long-term storage. Storage devices 48, in some examples, may comprise volatile memory, meaning that storage devices 48 do not maintain stored contents when the computer is turned off. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in one example, are used by software or applications running on computing device 2 (e.g., gesture module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, output device 46 may further include functionality of input device 42 and/or UI device 4, such that output device 46 provides both input and output functions.

In some examples, UI device 4 may include functionality of input device 42 and/or output device 46. In the example of FIG. 2, UI device 4 may be a presence-sensitive display. In the example of FIG. 2, UI device 4 may be a presence-sensitive display. In some examples, a presence-sensitive display may detect an object at and/or near the screen of the presence-sensitive display. As one non-limiting example range, a presence-sensitive display may detect an object, such as a finger or stylus, which is within 2 inches or less of the physical screen of the presence-sensitive display. The presence-sensitive display may determine a location (e.g., an (x,y) coordinate) of the presence-sensitive display at or near which the object was detected. In another non-limiting example range, a presence-sensitive display may detect an object 6 inches or less from the physical screen of the presence-sensitive display, and other exemplary ranges are also possible. The presence-sensitive display may determine the location selected by the object (e.g., user's finger) using capacitive, inductive, and/or optical recognition techniques. In some examples, the presence-sensitive display provides output using tactile, audio, or video stimuli as described with respect to output device 46.

Computing device 2 may include operating system 58. Operating system 58, in some examples, controls the operation of components of computing device 2. For example, operating system 58, in one example, facilitates the communication of UI module 6 and/or gesture module 8 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Computing device 2 may include active beam 54. Active beam 54, in some examples, is configured to store one or more tokens created by gesture module 8. Active beam 54 may be included within storage devices 48. The specific functionality of active beam 54 is further described in the description of FIGS. 3A-3D and FIGS. 9A-9B below.

Computing device 2 may also include next beam 56. Next beam 56, in some examples, is configured to store one or more tokens created by gesture module 8. Next beam 56 may be included within storage devices 48. The specific functionality of next beam 56 is further described in the description of FIGS. 3A-3D and FIGS. 9A-9B below.

Computing device 2 can include additional components that, for clarity, are not shown in FIG. 2. For example, computing device 2 can include a power source (e.g., battery) to provide power to the components of computing device 2. Similarly, the components of computing device 2 shown in FIG. 2 may not be included in every example of computing device 2. For example, in some configurations, computing device 2 may not include communication unit 44.

In accordance with the techniques of this disclosure, computing device 2 may output a gesture-based, graphical keyboard comprising a plurality of keys. User 18 may perform a multi-touch gesture comprising multiple sub-gestures to select a group of keys of the plurality of keys at input device 42. In response to user 18 performing the multi-touch gesture, input device 42 may detect one or more gesture paths, such as gesture paths 21 and 22 of FIG. 1, which may be received by UI module 6 as gesture path data. UI module 6 may send the gesture path data to gesture module 8. In some examples, UI module 6 incrementally sends the gesture path data to gesture module 8 as gesture paths 21 and 22 are detected by input device 42.

In response to receiving the gesture path data for gesture paths 21 and 22, gesture module 8 may create a token at the entry node of a lexicon which may be included in language model 10. In some examples, language module 10 may be implemented as a trie data structure. Each movable token may represent a partial alignment between a node in the lexicon (i.e., partial word) and a point along the multi-touch gesture. As the token advances to child nodes in the lexicon (i.e., next letters in the word), the corresponding alignment point on the gesture may advance as well. As the token advances to the next letter in a word, techniques of the disclosure may determine how far the token is to advance along a respective gesture path. For instance, techniques of the disclosure may include search for an alignment point along the gesture paths that best aligns to a letter of a key, taking into account a number of features described herein.

As described in FIG. 1, a lexicon trie data structure may contain a plurality of nodes, each node may represent a letter. Gesture module 8 may push the token into active beam 54. Gesture module 8 may create a token copy on each of the token's child nodes. In the example of FIG. 1, gesture module 8 may create a first token copy on the child node representing the letter "N" and a second token copy on the child node representing the letter "B."

For each token copy, gesture module 8 may determine, based on a plurality of features associated with the gesture path data, alignment points traversed by the sub-gestures of finger 25 and 27. In the example of FIG. 1, gesture module 8 may determine that a first alignment point associated with the sub-gesture of finger 25 is located at the start of gesture path 22. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (e.g., the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (e.g., a point was missed in-between).

In some examples, an alignment point may be based on a maximum distance between points of a sub-gesture segment between two or more points and an ideal line from a first key to a second key on keyboard 16. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys. Each of the respective cost values may represent a probability that the alignment point indicates a key of the plurality of keys. In the example of FIG. 1, gesture module 8 may determine a first cost value representing a probability that the first alignment point indicates the node representing the letter "N" and a second cost value representing a probability that the first alignment point indicates the node representing the letter "B." In some examples, gesture module 8 may then update the token copy with the respective alignment point and/or cost value and push the token copy in next beam 56. In the example of FIG. 1, gesture module 8 may add the first cost value to the first token copy and the second cost value to the second token copy.

In some examples, gesture module 8 determines the respective cost values by comparing respective physical cost values with respective lexical cost values, as further described below. The physical cost values may be based on the plurality of features associated with the gesture path data and/or the alignment points traversed by the sub-gestures of fingers 25 and 27. In some examples, gesture module 8 may weigh the respective physical cost values differently than the respective lexical cost values. For instance, gesture module 8 may determine a cost value by summing the result of multiplying a physical cost value by a physical weighting value, and multiplying a lexical cost value by a lexical weighting value.

In some examples, gesture module 8 may determine that the lexical cost values should be weighted greater than the physical cost values. Gesture module 8 may determine that the lexical cost values should be weighted greater than the physical cost values where there is an indication that the physical cost values may be unreliable, such as where the gesture path is detected at high rate of speed. For instance, gesture module 8 may determine that a value associated with a feature (e.g., speed) satisfies one or more thresholds. For instance, gesture module 8 may determine that speed of the gesture is greater than or equal to a threshold value. In other examples, gesture module 8 may determine that the speed of the gesture is less than or equal to a threshold value. In any case, gesture module 8 may determine that the physical cost values are unreliable if the determined value satisfies a threshold.

In some examples, gesture module 8 may use statistical machine learning to adapt to the style of user 18 and modify the weighting values over time. For instance, gesture module 8 may, in response to determining that user 18 is inaccurate while performing gestures, weigh the lexical cost values greater than the physical cost values. In some examples, gesture module 8 may determine that the physical cost values should be weighted greater than the lexical cost values. Gesture module 8 may determine that the physical cost values should be weighted greater than the lexical cost values where there is an indication that the lexical cost values may be unreliable, such as where user 18 has a history of entering words not included in the lexicon. In some examples, the weighting values may be estimated and optimized heuristically, such as by measuring accuracy from a plurality of computing devices.

Gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key. Physical features of the plurality of keys may be included in key regions 52 (which may, in some examples, be included or part of a spatial model utilized by gesture module 8). For example, key regions 52 may include, for each of the plurality of keys, a set of coordinates that correspond to a location and/or area of graphical keyboard 16 where each key is displayed. In the example of FIG. 1, gesture module 8 may determine a first physical cost value based on the Euclidian distance between the first alignment point and a region associated with the "N" key 20A (e.g., center of key 20A). In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of the at least two keys of the plurality of keys. Each of the respective lexical cost values may represent a probability that a letter represented by a key of the plurality of keys is included in the candidate word. The lexical cost values may be based on language model 10. For instance, the lexical cost values may represent the likelihood that a given letter is selected based on probable words included in language model 10. In the example of FIG. 1, gesture module 8 may determine a first lexical cost value based on an entry in language model 10 indicating a frequency that the letter "N" is the first letter in a word.

Gesture module 8 may determine whether the token is at a terminal node of the lexicon. In response to determining that the token is at a terminal node, gesture module 8 may add the token (or a representation thereof) to a list of output predictions. In some cases, gesture module 8 may compare the respective cost values for each node from the entry node to the terminal node to determine a combined cost value for the word indicated by the terminal node. In other cases, the combined cost value for the word indicated by the terminal node may be reflected by the token's cost value. In either case, gesture module 8 may then discard the token (e.g., remove the token from active beam 54). For instance, in one example, in the token passing process, gesture module 8 may keep only a group of top-n tokens, and discard the rest. The top-n tokens may be the tokens with the most likely words or character strings. In this way, gesture module 9 may efficiently scale to large lexicons. Alternative embodiments may use any suitable search techniques.

Gesture module 8 may then determine whether UI module 6 has completed receiving the gesture path data (e.g., for gesture paths 21 and 22 shown in FIG. 1). Where UI module 6 has completed receiving the gesture path data, gesture module 8 may output one or more candidate words for display at output device 46 (e.g., "NODE"). Where UI module 6 has not completed receiving the gesture path data, gesture module 8 may continue to incrementally process the gesture path data. In some examples, gesture module 8 may output one or more output predictions prior to UI module 6 completing reception of the gesture path data. The techniques are further described below in the description of FIG. 3.

Figure 9A:
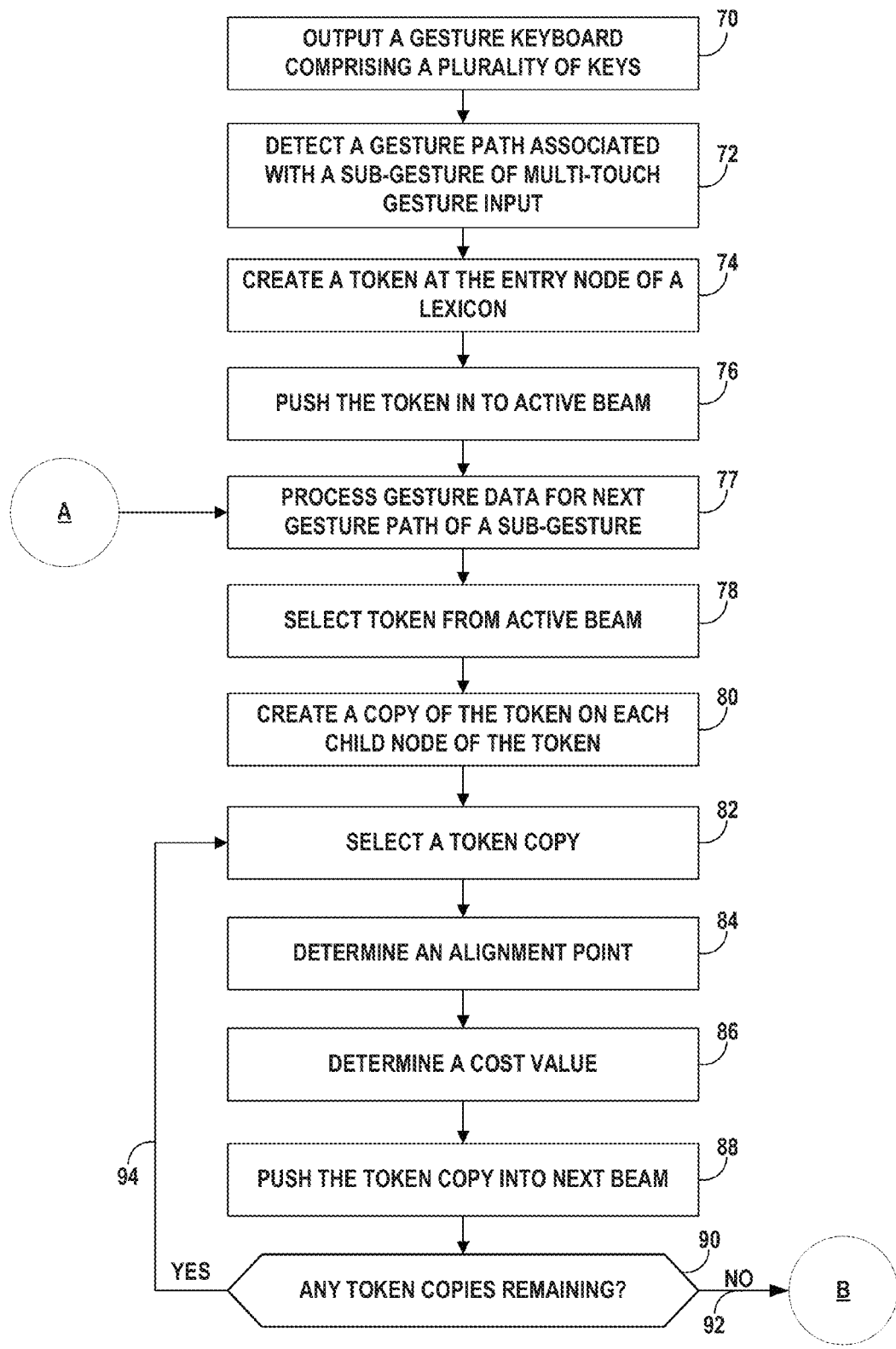
FIGS. 9A-9B are flow diagrams illustrating example operations of a computing device to determine a candidate word from gesture input, in accordance with one or more techniques of the present disclosure.
Figure 9B:
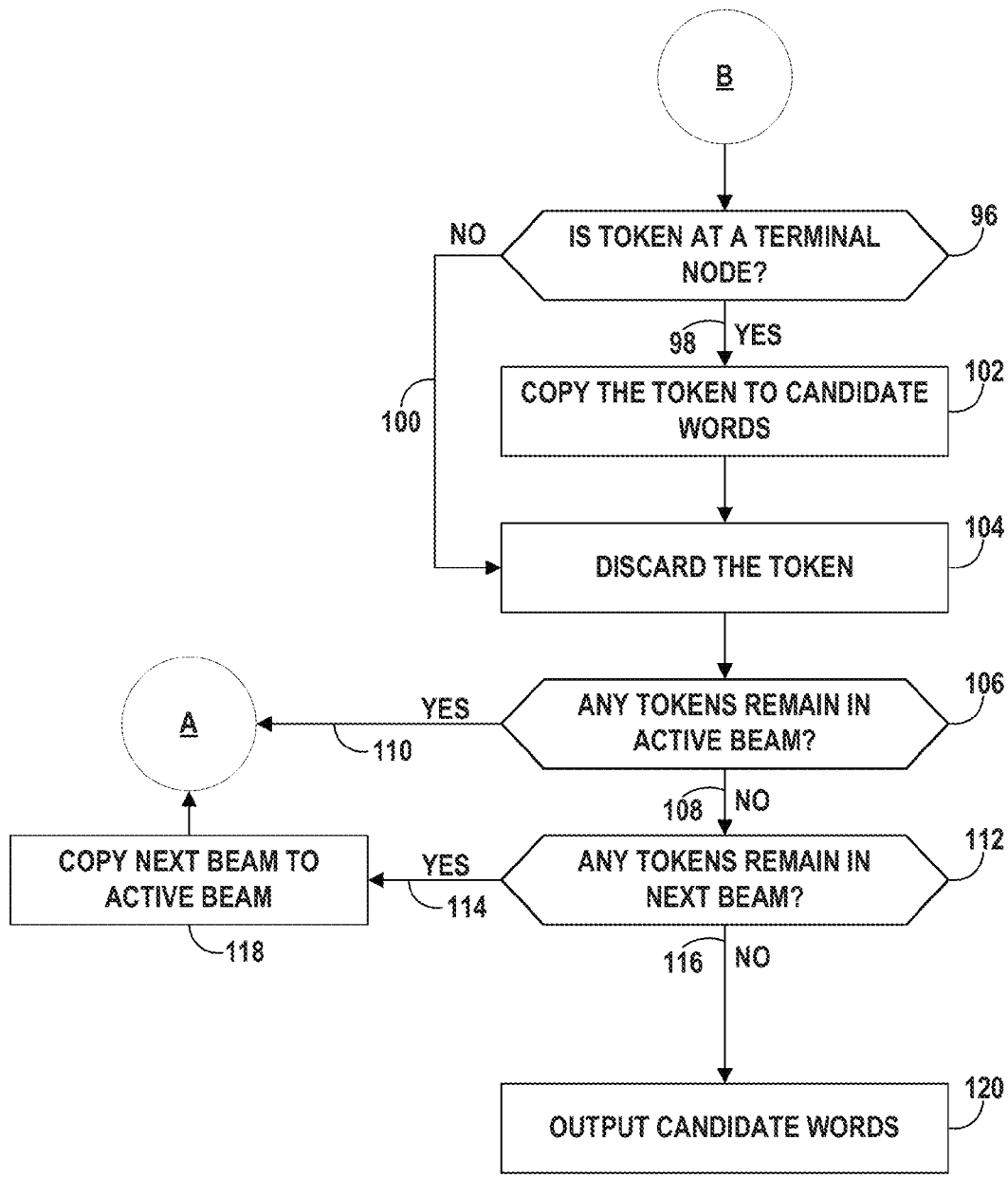

FIGS. 3A-3D are conceptual diagrams illustrating examples of graphical keyboard 16 shown in FIG. 1 and multi-touch gesture input, in accordance with one or more techniques of the present disclosure. (FIGS. 9A-9B show additional details of the implementation of active and next beams when determining candidate words based upon multi sub-gesture input for a multi-touch gesture, according to certain example techniques.)

Figure 3A:
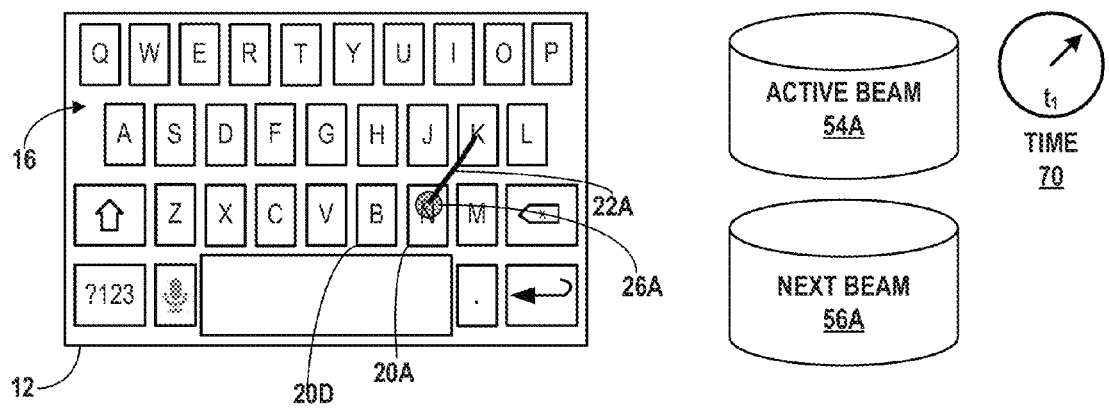
FIGS. 3A-3D are conceptual diagrams illustrating examples of the graphical keyboard shown in FIG. 1 and multi-touch gesture input, in accordance with one or more techniques of the present disclosure.

As shown in the conceptual example of FIG. 3A, at time 70, computing device 2 may include GUI 12, active beam 54A, and next beam 56A. GUI 12 may include graphical keyboard 16 which may include "N" key 20A, "B" key 20D, gesture path 22A, and alignment point 26A. While shown in FIG. 3A, gesture path 22A and/or alignment point 26A may not be visible during the performance of the techniques described herein.

As shown in the example of FIG. 1, a user may desire to enter text into computing device 2 by performing a multi-touch gesture comprising multiple sub-gestures associated with fingers 25 and 27 at gesture-based, graphical keyboard 16. As previously discussed, while user 18 performs the multi-touch gesture, computing device 2 may detect a sub-gesture having a gesture path. In the example of FIG. 3A, computing device 2 is shown as having detected gesture path 22A associated with the sub-gesture of finger 25 (shown in FIG. 1).

In response to detecting gesture path 22A, computing device 2 may determine alignment point 26A along gesture path 22A. Additionally, in response to detecting gesture path 22A, computing device 2 may create a token and push the token into active beam 54A. At time 70, the contents on active beam 54A may be represented by Table 1 below.

TABLE 1

| Index | Parent Index | Letter Key of Current Node | Letter Chain | Cost Value |
|---|---|---|---|---|
| 0 | — | — | — | 0 |

In Table 1, each row represents an individual token, the index column represents a unique identifier for each token, the parent index column represents the index value of the token to which the listed token is a child, the letter key of the current node column represents the letter key represented by the current node of the token, the letter chain column represents all of the letter keys represented by the nodes from the entry node to the current node of the token, and the cost value column represent the cost value of the token. As shown in Table 1, the created token has an index of 0 (i.e., $token_0$), no parent index, no letter key of the current node, no letter chain, and a cost value of zero.

To incrementally and dynamically determine the text indicated by the gesture, computing device 2 may create a copy of each token on its child nodes. In some examples, an entry node may have 26 child nodes, one for each letter of the English alphabet. For simplicity and purposes of illustration only, in the example of FIG. 3A, the entry node has only two child nodes for the letters "B" and "N." Therefore, computing device 2 may create a copy of the token with index 0 on child node "N" (i.e., $token_1$) and child node "B" (i.e., $token_2$). For each created token copy, computing device 2 may determine a cost value as described above. Computing device 2 may push each token copy in to next beam 56A, the contents of which may be represented by Table 2 below.

TABLE 2

| Index | Parent Index | Letter Key of Current Node | Letter Chain | Cost Value |
|---|---|---|---|---|
| 1 | 0 | N | N | CV1 |
| 2 | 0 | B | B | CV2 |

The entries shown in Table 2 are identical in format to the entry shown in Table 1. In Table 2, $token_1$ has cost value CV1 and $token_2$ has cost value CV2. After creating the token copies, computing device 2 may determine that $token_0$ is not a terminal node and discard $token_0$. Computing device 2 may subsequently determine whether active beam 54A is empty (i.e., contains no tokens). In response to determining that active beam 54A is empty, computing device 2 may copy the contents of next beam 56A to active beam 54B of FIG. 3B and discard the contents of next beam 56A.

Figure 3B:
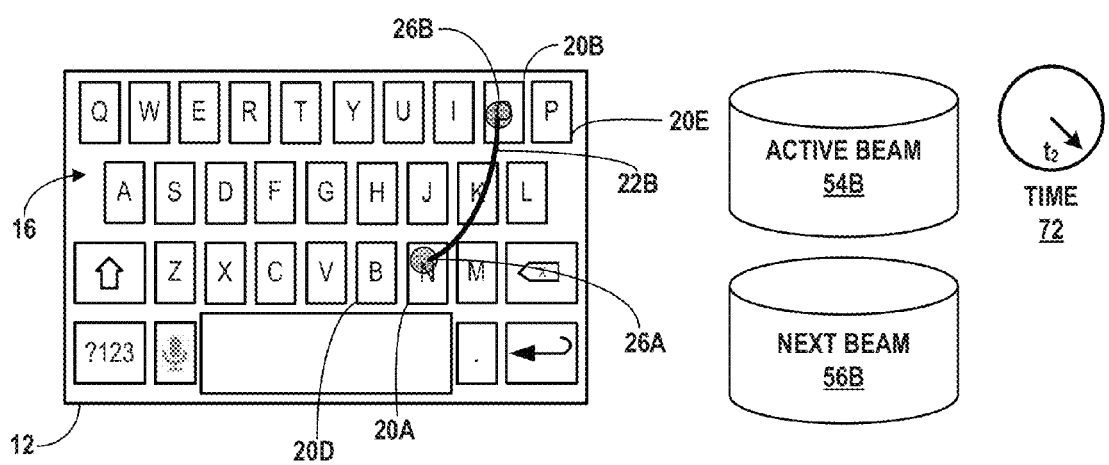

In the example of FIG. 3B, computing device 2 is shown as having detected gesture path 22B at time 72. Gesture path 22B is traversed by finger 25 (FIG. 1) when performing the sub-gesture associated with finger 25. As described above, the contents of active beam 54B may be represented by Table 2. Computing device 2 may determine alignment point 26B along gesture path 22B. Computing device 2 may, for each token in active beam 54B, create a copy on each child node. In the example of FIG. 3B, $token_1$ and $token_2$ each have child nodes with letter keys "O" and "P" (for purposes of illustration only). For each created token copy, computing device 2 may determine a cost value as described above. Computing device 2 may push each token copy in to next beam 56B, the contents of which may be represented by Table 3 below.

TABLE 3

| Index | Parent index | Letter Key of Current Node | Letter Chain | Cost Value |
|---|---|---|---|---|
| 3 | 1 | O | NO | CV1 + CV3 |
| 4 | 1 | P | NP | CV1 + CV4 |
| 5 | 2 | O | BO | CV2 + CV5 |
| 6 | 2 | P | BP | CV2 + CV6 |

The entries shown in Table 3 are identical in format to the entries shown in Table 1 and Table 2. In Table 3, the cost value for each token includes the cost value for the previous letters and the cost value for the current letter. Computing device 2 may determine which, if any, of the tokens are on terminal nodes. For instance, computing device 2 may determine that $token_3$ is on a terminal node because its letter chain "NO" is a word. In response to determining that a token is on a terminal node, computing device 2 may copy the token to a list of output predictions. The list of output predictions may be represented by Table 4 below. In some examples, computing device 2 may copy only the letter chain of the token to the list of output predictions.

TABLE 4

| Index | Parent Index | Letter Key of Current Node | Letter Chain | Cost Value |
|---|---|---|---|---|
| 3 | 1 | O | NO | CV1 + CV3 |

Computing device 2 may subsequently determine whether active beam 54B is empty. In response to determining that active beam 54B is empty, computing device 2 may copy the contents of next beam 56B to active beam 54C of FIG. 3C and discard the contents of next beam 56B.

Figure 3C:
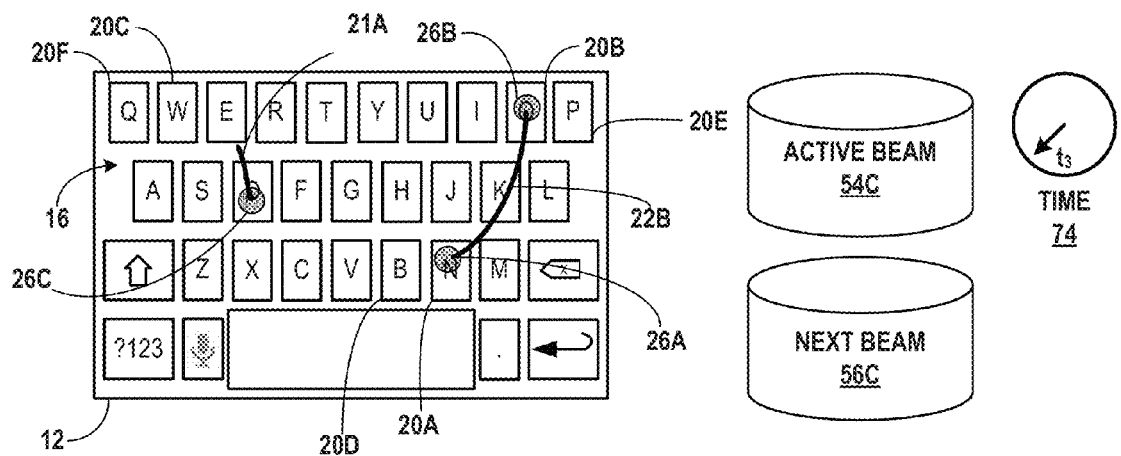

In the example of FIG. 3C, computing device 2 is shown as having detected gesture path 21A at time 74. Gesture path 21A is traversed by finger 27 (FIG. 1) when performing the sub-gesture associated with finger 27. As described above, the contents of active beam 54C may be represented by Table 3. Computing device 2 may determine alignment point 26C along gesture path 21A. Computing device 2 may, for each token in active beam 54C, create a copy on each child node. In the example of FIG. 3C, $token_3$ through $token_6$ each have child nodes with letter keys "D" and "S" (for purposes of illustration only in this example). For each created token copy, computing device 2 may determine a cost value as described above. Computing device 2 may push each token copy in to next beam 56C, the contents of which may be represented by Table 5 below.

TABLE 5

| Index | Parent Index | Letter Key of Current Node | Letter Chain | Cost Value |
|---|---|---|---|---|
| 7 | 3 | D | NOD | CV1 + CV3 + CV7 |
| 8 | 3 | S | NOS | CV1 + CV3 + CV8 |
| 9 | 4 | D | NPD | CV1 + CV4 + CV9 |
| 10 | 4 | S | NPS | CV1 + CV4 + CV10 |
| 11 | 5 | D | BOD | CV2 + CV5 + CV11 |
| 12 | 5 | S | BOS | CV2 + CV5 + CV12 |
| 13 | 6 | D | BPD | CV2 + CV6 + CV13 |
| 14 | 6 | S | BPS | CV2 + CV6 + CV14 |

The entries shown in Table 5 are identical in format to the entries shown in Tables 1-4. In Table 5, the cost value for each token includes the cost value for the previous letters and the cost value for the current letter. Computing device 2 may determine which, if any, of the tokens are on terminal nodes. For instance, computing device 2 may determine that token$_7$ is on a terminal node because its respective letter chain "NOD" is a word. In response to determining that a token is on a terminal node, computing device 2 may copy token$_7$ to a list of output predictions. The list of output predictions may be represented by Table 6 below.

TABLE 6

| Index | Parent Index | Letter Key of Current Node | Letter Chain | Cost Value |
|---|---|---|---|---|
| 3 | 1 | O | NO | CV1 + CV3 |
| 7 | 3 | D | NOD | CV1 + CV3 + CV7 |

Computing device 2 may subsequently determine whether active beam 54C is empty. In response to determining that active beam 54C is empty, computing device 2 may determine whether user 18 has completed performing the multi-touch gesture. In response to determining that user 18 has not yet completed the sub-gesture associated with finger 27 (FIG. 1) of the multi-touch gesture, and in response to determining that active beam 54C is empty, computing device 2 may copy the contents of next beam 56C to active beam 54D of FIG. 3D and discard the contents of next beam 56C.

Figure 3D:
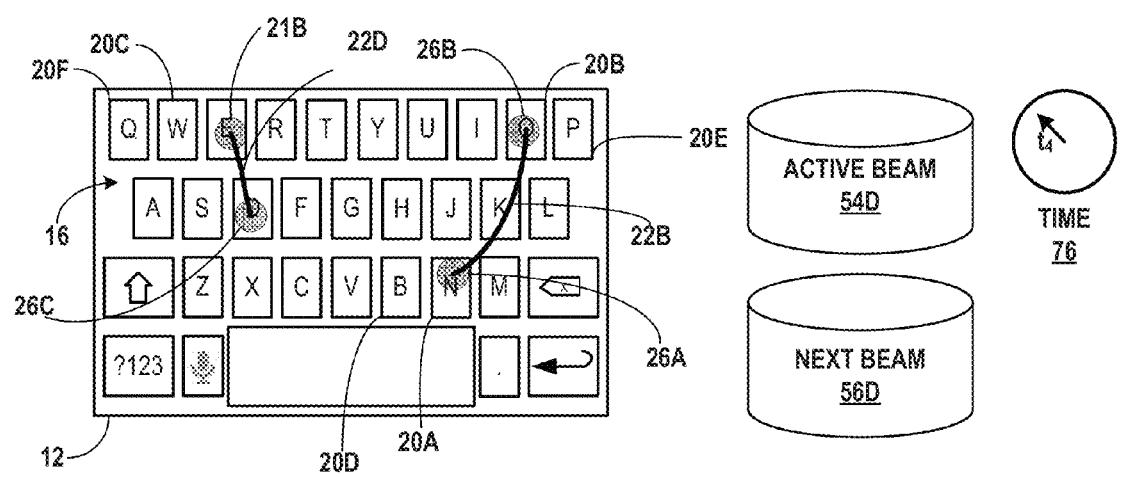

In the example of FIG. 3D, computing device 2 is shown as having detected gesture path 21B at time 76. Gesture path 21B is traversed by finger 27 (FIG. 1) when performing the sub-gesture associated with finger 27. As described above, the contents of active beam 54D may be represented by Table 5. Computing device 2 may determine alignment point 26D along gesture path 21B. Computing device 2 may, for each token in active beam 54D, create a copy on each child node. In the example of FIG. 3D, token$_7$ through token$_{14}$ each have child nodes with letter keys "E" and "W" (for purposes of illustration only in this example). For each created token copy, computing device 2 may determine a cost value as described above. Computing device 2 may push each token copy in to next beam 56D, the contents of which may be represented by Table 5 below.

TABLE 7

| Index | Parent Index | Letter Key of Current Node | Letter Chain | Cost Value |
|---|---|---|---|---|
| 15 | 7 | E | NODE | CV1 + CV3 + CV7 + CV15 |
| 16 | 7 | W | NODW | CV1 + CV3 + CV7 + CV16 |
| 17 | 8 | E | NOSE | CV1 + CV3 + CV8 + CV17 |
| 18 | 8 | W | NOSW | CV1 + CV3 + CV8 + CV18 |
| 19 | 9 | E | NPDE | CV1 + CV4 + CV9 + CV19 |
| 20 | 9 | W | NPDW | CV1 + CV4 + CV9 + CV20 |
| 21 | 10 | E | NPSE | CV1 + CV4 + CV10 + CV21 |
| 22 | 10 | W | NPSW | CV1 + CV4 + CV10 + CV22 |
| 23 | 11 | E | BODE | CV2 + CV5 + CV11 + CV23 |
| 24 | 11 | W | BODW | CV2 + CV5 + CV11 + CV24 |
| 25 | 12 | E | BOSE | CV2 + CV5 + CV12 + CV25 |
| 26 | 12 | W | BOSW | CV2 + CV5 + CV12 + CV26 |
| 27 | 13 | E | BPDE | CV2 + CV6 + CV13 + CV27 |
| 28 | 13 | W | BPDW | CV2 + CV6 + CV13 + CV28 |
| 29 | 14 | E | BPSE | CV2 + CV6 + CV14 + CV29 |
| 30 | 14 | W | BPSW | CV2 + CV6 + CV14 + CV30 |

The entries shown in Table 7 are identical in format to the entries shown in Tables 1-6. In Table 7, the cost value for each token includes the cost value for the previous letters and the cost value for the current letter. Computing device 2 may determine which, if any, of the tokens are on terminal nodes. For instance, computing device 2 may determine that token$_{15}$ is on a terminal node because its respective letter chain "NODE" is a word. Computing device 2 may determine that token$_{17}$ is on a terminal node because its respective letter chain "NOSE" is a word. Computing device 2 may further determine that token$_{23}$ is on a terminal node because its respective letter chain "BODE" is a word. In response to determining that these tokens are on terminal nodes, computing device 2 may copy token$_{15}$, token$_{17}$, and token$_{23}$ to a list of output predictions. The list of output predictions may be represented by Table 8 below.

TABLE 8

| Index | Parent Index | Letter Key of Current Node | Letter Chain | Cost Value |
|---|---|---|---|---|
| 3 | 1 | O | NO | CV1 + CV3 |
| 7 | 3 | D | NOD | CV1 + CV3 + CV7 |
| 15 | 7 | E | NODE | CV1 + CV3 + CV7 + CV15 |
| 17 | 8 | E | NOSE | CV1 + CV3 + CV8 + CV17 |
| 23 | 11 | E | BODE | CV2 + CV5 + CV11 + CV23 |

Computing device 2 may subsequently determine whether active beam 54D is empty. In response to determining that active beam 54D is empty, computing device 2 may determine whether user 18 has completed performing the multi-touch gesture. In response to determining that the multi-touch gesture is complete, computing device 2 may output the list of output predictions. In some examples, computing device 2 may determine a subset of the list of output predictions which have the highest cost values (e.g., the predictions with the best probability). Additionally, in some examples, computing device 2 may, at each subsequent alignment point, revise the cost values of the tokens contained in the list of output predictions. For instance, computing device 2 may adjust the cost value of token$_3$ to make token$_3$ less probable in response to detecting gesture path 21A. Computing device 2 may further adjust the cost value of token$_7$ to make token$_7$ less probably in response to detecting gesture path 21B. As a result, gesture module 8 may select token$_{15}$, token$_{17}$, and token$_{23}$ in a final group of output predictions to be output by UI module 6, as shown in the example of FIG. 1 in suggestion area 24.

In the examples shown in FIGS. 3A-3D, gesture module 8 is capable of determining, based on the alignment points traversed by gesture paths 22A, 22B, 21A, and 21B, at least one probability that a particular key of keyboard 16 is associated with the sub-gesture of finger 25 or the sub-gesture of finger 27. Gesture module 8 may then determine the candidate word (e.g., "NODE") based at least in part on the association of the keys with these sub-gestures.

In some examples, gesture module 8 may determine the at least one probability that a given key of keyboard 16 is associated with the sub-gesture of finger 25 or the sub-gesture of finger 27 at least by determining a first probability that the key is associated with the sub-gesture of finger 25 and determining a second probability that the key is associated with the sub-gesture of finger 27. If the first probability is greater than the second probability, gesture module 8 determines that the key is included in the group of keys associated with the sub-gesture of finger 25. If, however, the second probability is greater than the first probability, gesture module 8 determines that the key is included in the group of keys associated with the sub-gesture of key 27. As a result, gesture module 8 may determine that keys "N" and "O" are associated with the sub-gesture of finger 25 and that keys "D" and "E" are associated with the sub-gesture of finger 27.

In some examples, gesture module 8 may determine the probability that a given key in keyboard 16 is included in a group of keys associated with a given sub-gesture based at least in part one or more features associated with the sub-gesture and/or alignment points traversed by the sub-gesture, as previously discussed. For example, gesture module 8 may determine a probability that a given key is associated with the sub-gesture of finger 25 or 27 is based on one or more of the following features: a length of a segment associated with the sub-gesture, wherein the segment comprises a path traversed by the sub-gesture; a direction of movement associated with the segment of the sub-gesture; a curvature of the segment of the sub-gesture; a local speed that represents a rate at which the segment of the sub-gesture is detected; and a global speed that represents a rate at which the sub-gesture is detected.

FIGS. 4-7 are conceptual diagrams illustrating further examples of graphical keyboard 16 and multi-touch gesture input, in accordance with one or more techniques of the present disclosure. In the first example of FIG. 4, GUI 12, which may be provided as output via UI device 4, includes a suggestion area 59 and graphical keyboard 16. As user 18 moves fingers 25 and 27 across keyboard 16 to select various keys, gesture module 8 is capable of processing the multi-touch gesture input to predict, or suggest, candidate words for selection to user 18. These candidate words may be displayed in suggestion area 59.

Figure 4:
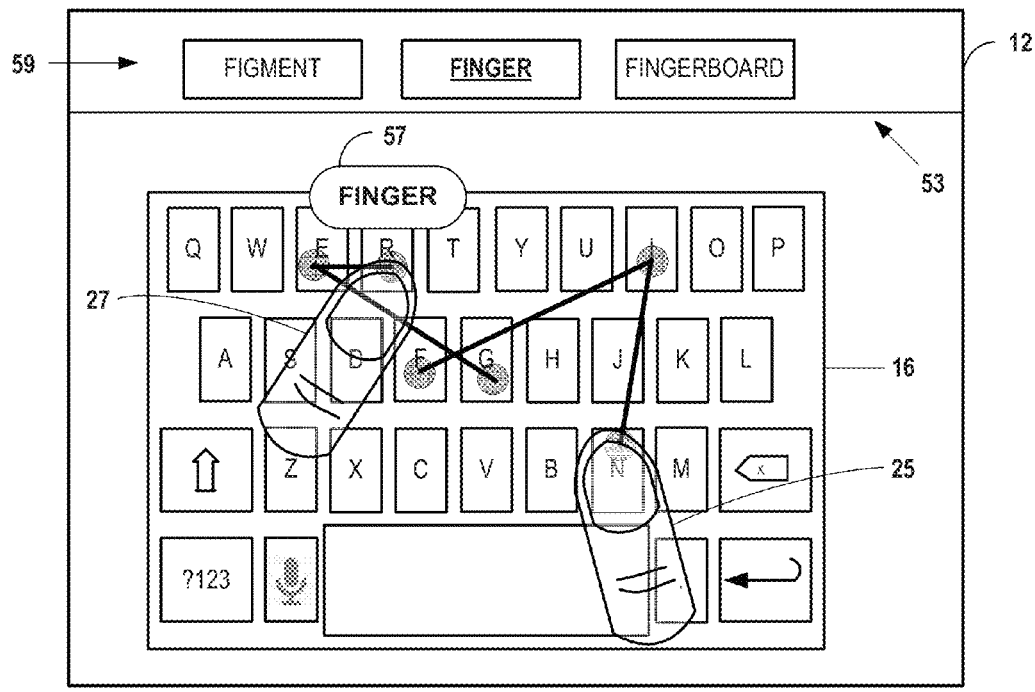
FIGS. 4-7 are conceptual diagrams illustrating further examples of a graphical keyboard and multi-touch gesture input, in accordance with one or more techniques of the present disclosure.

In the particular example of FIG. 4, user 18 begins a first sub-gesture of a multi-touch gesture (e.g., a multi-touch swipe or movement gesture, a tap gesture) by touching finger 25 at a point of UI device 4 that gesture module 8 determines is substantially aligned or associated with the key "F" of keyboard 16. (For purposes of illustration only in the examples of FIGS. 4-7, it will be assumed that UI device 4 comprises a presence-sensitive display. It is also assumed that fingers 25 and 27 may move either sequentially or substantially simultaneously to select intended keys of keyboard 16.)

User 18 also moves finger 25 at UI device 4 to a point of UI device 4 that gesture module 8 determines is substantially aligned or associated with the key "I" of keyboard 16. User 18 moves finger 25 at UI device 4 to a point that gesture module 8 determines that is substantially aligned or associated with the key "N" of keyboard 16.

After user 18 has moved finger 25 as indicated above, user 18 may then begin a second sub-gesture of the multi-touch gesture by touching finger 27 at a point of UI device 4 that gesture module 8 determines is substantially aligned or associated with the key "G" of keyboard 16. User 18 may then move finger 27 to a point of UI device 4 that gesture module 8 determines is substantially aligned or associated with the key "E" of keyboard 16. User 18 moves finger 27 at UI device 4 to a point that gesture module 8 determines that is substantially aligned or associated with the key "R" of keyboard 16. The separate gesture trails for each of the first sub-gesture associated with finger 25 and the second sub-gesture associated with finger 27 are indicated in FIG. 4.

While user 18 performs these first and second sub-gestures of the multi-touch gesture shown in FIG. 4, gesture module 8 is capable of continuously and dynamically, in real-time, performing gesture recognition to determine which points of these gestures are aligned to particular keys of keyboard 16 and also to determine/suggest candidate words to user 18 in suggestion area 59. To do so, in some examples, gesture module 8 may utilize spatial and/or language models, as described previously, to determine candidate words. The candidate words that are determined by gesture module 8 may dynamically change or adapt as user 18 moves fingers 25 and 27 across UI device 4, and UI module 6 may therefore dynamically update the candidate words displayed in suggestion area 59 as user 18 incrementally selects characters.

As shown in the example of FIG. 4, each of the first and second sub-gestures associated with fingers 25 and 27, respectively, may comprise a swipe gesture or a tap gesture. The candidate words displayed in suggestion area 59 may be determined contemporaneously with receiving at least one of the first sub-gesture and the second sub-gesture.

As noted above, upon detecting character input based upon the multi-touch gesture input from user 18, gesture module 8 is capable of determining to which stroke, or sub-gesture of the multi-touch gesture input, each letter of the word should be aligned or associated. For example, in FIG. 4, gesture module 8 is capable of determining that the letters "FIN" should be aligned to the right-hand sub-gesture associated with finger 25, while the letters "GER" should be aligned to the left-hand sub-gesture associated with finger 27. This process may happen incrementally as gesture module 8 processes each letter in the candidate word, assigning each letter to the path that results in the best alignment score, taking into account a number of spatial features, in some examples, such as distance, direction, straightness, and other features associated with the sub-gestures and the keys of keyboard 16. Gesture module 8 is capable of tracking the movement of each sub-gesture independently as fingers 25 and 27 slide across the keys in keyboard 16 to map out the letters in a candidate word. Each sub-gesture can draw any part of the word, and user 18 can move both fingers 25 and 27 simultaneously or sequentially.

In some examples, the candidate word (e.g., "FINGER" in FIG. 4) is committed once both fingers 25 and 27 are lifted from keyboard 16. For example, UI module 6 may receive a first indication of a termination of the first sub-gesture associated with finger 25 and a second indication of a termination of the second sub-gesture associated with finger 27. UI module 6 may outputting a candidate word (e.g., the word "FINGER" in text-entry area 14 shown in FIG. 1) responsive to receiving the first indication of the termination of the first sub-gesture and the second indication of the termination of the second sub-gesture. In other examples, however, the candidate word is not committed until user 18 takes further action (e.g., uses one of fingers 25 or 27 to interact with another key of keyboard 16, such as the space bar, manually selects the candidate word in selection area 59 or in a preview area 57).

As is shown in FIG. 4, the top candidate words determined by gesture module 8 are displayed by UI module 6 to user 18 within suggestion area 59 of GUI 12. Gesture module 8 may dynamically select and change the group of candidate words shown in suggestion area 59 based upon the incremental feedback provided by the sub-gestures associated with fingers 25 and 27. In the example of FIG. 4, these candidate words are "FIGMENT," "FINGER," AND "FINGERBOARD." The top or most likely candidate word of this group of candidate words is prominently displayed to user 18 within suggestion area 59 to visually distinguish this candidate word from the one or more other suggested words included in suggestion area 59. In FIG. 4, the top candidate word "FINGER" is underlined and also shown in bold font. Gesture module 8 dynamically selects this top candidate word based upon a probability that user 8 intends to enter this word based upon the recognition of the multi-touch gesture input provided by the first and second sub-gestures associated with fingers 25 and 27, respectively. Gesture module 8 may determine the one or more other suggested words based at least in part on the at least one probability that the at least one key is associated with at least one of the sub-gesture of finger 25 and the sub-gesture of finger 27.

In some examples, the top candidate word may also be displayed to user 18 in a floating preview area 57, in real time, as user 18 is gesturing. Floating preview area 57 is optional but may be utilized to provide user 18 with a preview area that moves around keyboard 16 as fingers 25 and 27 move.

In some cases, floating preview area 57 appears above the most recent input point of a sub-gesture of a multi-touch gesture, such as in the example of FIG. 4, such that floating preview area 57 appears to float on top of the active (currently moving) finger. In FIG. 4, floating preview area 57, which includes the top candidate word "FINGER," appears above the input point associated with the letter "R" from the sub-gesture of finger 27. In other cases, floating preview area 57 appears above the first input point of a sub-gesture of a multi-touch gesture.

In various different examples, the candidate word "FINGER" may be output in floating preview area 57 at a location that corresponds to any point of a first group of points traversed by the first sub-gesture (associated with finger 25) or any point of the second group of additional alignment points traversed by the second sub-gesture (associated with finger 27). For example, after user 18 has completed the first sub-gesture associated with finger 25 in an effort to select characters "FIN," user 18 may begin the second sub-gesture associated with finger 27 to begin selecting additional characters. Gesture module 8 may determine whether the additional points are associated with the first sub-gesture and/or the second sub-gesture based at least in part on one or more features associated with the first sub-gesture and/or the second sub-gesture. For example, as described earlier, gesture module 8 may make such a determination based on such features as a distance traversed by, direction, and straightness of the first and/or second sub-gestures. UI module 6 may then output the candidate word in floating preview area 57 at a location that corresponds to one of the additional points. In FIG. 4, UI module 6 outputs the candidate word "FINGER" in floating preview area 57 above the point aligned with key the "R" in keyboard 16, which is associated with the second sub-gesture associated with finger 27. In general, the first sub-gesture and/or the second sub-gesture may comprise one or more gesture segments, as previously described.

In certain examples, UI module 6 may determine a location at which to output floating preview area 57 based which points traversed by a given sub-gesture are closer to an edge or boundary of keyboard 16, such as boundary 53 shown in FIG. 4. Boundary 53 comprises a topmost boundary of keyboard 16 within GUI 12. Boundary 53 serves as a boundary between keyboard 16 and suggestion area 59 of GUI 12.

For instance, a first group of points traversed by the first sub-gesture of the multi-touch gesture illustrated in FIG. 4 may comprise a first sequence of points. The first sub-gesture is performed by finger 25 and may traverse the first sequence of points associated with the keys "F" "I" and "N." A second group of points traversed by the second sub-gesture performed by finger 27 may comprises a second sequence of points that are associated with the keys "G" "E" and "R."

Gesture module 8 may determine a first distance between a final point of the first sequence of points traversed by the first sub-gesture of finger 25 and boundary 53 of keyboard 16. The final point of the first sequence of points traversed by the first sub-gesture is associated with the "N" key, as shown in FIG. 4. Gesture module 8 may also determine a second distance between a final point of the second sequence of points traversed by the second sub-gesture of finger 27 and boundary 53. UI module 6 may then output the candidate word "FINGER" in floating preview area 57 at a location of UI device 4 that corresponds to either the final point of the first sequence of points or the final point of the second sequence of points based at least in part on a comparison the first distance to the second distance.

In the example of FIG. 4, since the second distance between the "R" key and boundary 53 is less than the first distance between the "N" key and boundary 53, UI module 6 outputs the candidate word "FINGER" in floating preview area 57 at a location that corresponds to the final point of the second sequence of points traversed by the second sub-gesture of finger 27 (e.g., above the "R" key). However, in other examples in which the first distance is less than the second distance, UI module 6 would be capable of outputting the candidate word "FINGER" in floating preview area 57 at a location that corresponds to the final point of the first sequence of points traversed by the first sub-gesture of finger 25. By outputting floating preview area 57 in such fashion, occlusion of floating preview area 57 by one of fingers 25 or 27 may be minimized or avoided.

In some examples, computing device 2 may determine whether a final point of the first sequence of points or a final point of the second sequence of points was received at UI device 4 more recently. Based at least in part on this determination, UI module 6 may output the candidate word at a location corresponding to the one of the final point of the first sequence of points and the final point of the second sequence of points. In the example of FIG. 4, computing device 2 determines that the final point of the second sequence of points (associated with key "R") for the second sub-gesture (finger 27) was received at UI device 4 more recently than the final point of the first sequence of points (associated with key "N") for the first sub-gesture (finger 25), UI module outputs the candidate word "FINGER" in floating preview area 57 at a location that corresponds to the point associated with key "R."

Figure 5:
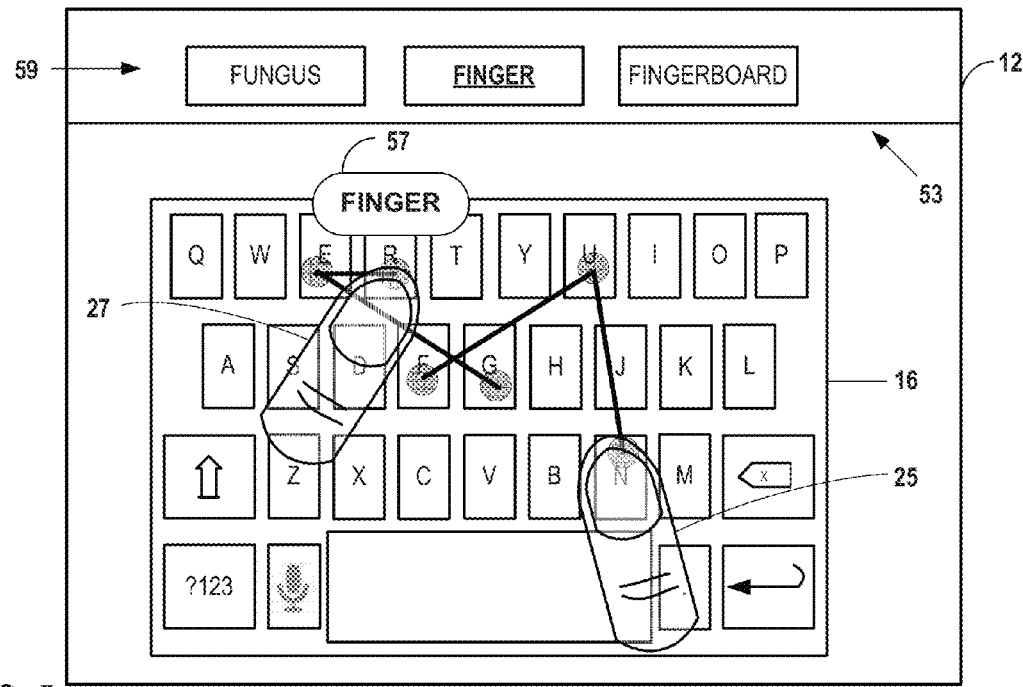

FIG. 5 is a conceptual diagram illustrating an example similar to the example of FIG. 4. In the example shown in FIG. 5, however, user 18 has provided first and second sub-gestures of a multi-touch gesture, using respective fingers 25 and 27, to select keys "F" "U" "N" "G" "E" and "R." Gesture module 8 may associate or align keys "F" "U" and "N" to the first sub-gesture of finger 25, while it associates keys "G" "E" and "R" with the second sub-gesture of finger 27. In this example, it is assumed that user 18 intends to input the word "FINGER" but has accidentally selected the "U" key instead of the "I" key in the first sub-gesture of finger 25.

Nevertheless, gesture module 8 is capable of incrementally performing a gesture recognition algorithm to provide suggested or candidate words within suggestion area 59.

Through usage of one or more models, such as a spatial and language model, gesture module 8 is capable of determining a group of candidate words after user 18 has selected keys "G" "E" and "R" using finger 27. The top candidate word, as shown in FIG. 5, is "FINGER," which is prominently displayed with respect to the remaining suggested words in suggestion area 59, and which is further optionally displayed in floating preview area 57. Based on the usage of such models, gesture module 8 is capable of predicting that user 18 intended to input the word "FINGER" even though user 18 may have mistakenly selected the "U" key in place of the "I" key. In such fashion, gesture module 8 is able to perform auto-correct functionality, wherein the candidate word "FINGER" includes characters that are not included in either of the group of characters associated with the keys selected by user 18 (such that gesture module 8 may perform auto-correct functionality). Because user 18 did mistakenly select the key "U," the group of potential candidate words in suggestion area 59 may be slightly different. For instance, as shown in FIG. 5, one candidate word "FUNGUS" in included in suggestion area 59. This candidate word is not, however, included in suggestion area 59 in FIG. 4, given that user 18 did not select the key "U" in the example of FIG. 4.

In the examples of FIGS. 4 and 5, user 18 may enter words using many different combinations of sub-gestures for fingers 25 and 27, and user 18 may move fingers 25 and 27 simultaneously or sequentially. For example, although user 18 has entered the word "FINGER" in the fashion shown in FIG. 4, user 18 could enter this same word using a multi-touch gesture (e.g., swipe gesture) in any number of different ways.

For example, in one alternate use case, user 18 could use finger 25 to perform a first sub-gesture that slides across UI device 4, as part of a multi-touch swipe gesture, to traverse points that are associated with keys "F" "I" "N" and "G." Subsequently, or even substantially simultaneously, user 18 could use finger 27 to perform a second sub-gesture to traverse points that are associated with keys "E" and "R." Gesture module 8 would be capable of using its gesture recognition algorithm to identify a top candidate word of "FINGER," just as in the example of FIG. 4, based on the identified keys of "F" "I" "N" "G" "E" and "R," even though the "G" key is associated with the sub-gesture of finger 25 rather than the sub-gesture of finger 27. Gesture module 8 is capable of dynamically and incrementally determining which traversed points of the multi-point gesture are associated with each sub-gesture, and therefore gesture module 8 is able to determine that the traversed point associated with key "G" is associated with the sub-gesture of finger 25. By processing all of the traversed points of the multi-touch gesture, gesture module 8 is able to identify the top candidate word of "FINGER."

In another alternate use case, user 18 could use finger 27 to traverse a point that is associated with key "F." Subsequently, or even substantially simultaneously, user 18 could use finger 25 to perform a second sub-gesture to traverse points that are associated with keys "I" and "N." User 18 may also use finger 27 to traverse points that are associated with keys "G" "E" and "R." In this example, user 18 may begin the multi-touch gesture using finger 27 but may use finger 25 to traverse points associated with intermediate keys for the intended word "FINGER." Similar to the prior examples, gesture module 8 is capable of incrementally determining which traversed points are associated with either the sub-gesture of finger 27 or the sub-gesture of finger 25. In any case, however, gesture module 8 is able to use the recognition algorithm to identify the top candidate word "FINGER," regardless of whether the sub-gestures of fingers 25 and 27 are provided simultaneously or sequentially.

FIG. 6 is a conceptual diagram illustrating another example in which it is assumed that user 18 intends to enter the word "KEYBOARD." In this example, user 18 begins a first sub-gesture of a multi-touch gesture (e.g., a multi-touch swipe or movement gesture) by touching finger 25 at a point of UI device 4 that gesture module 8 determines is substantially aligned or associated with the key "K" of keyboard 16.

User 18 also moves finger 27 at UI device 4 to a point of UI device 4 that gesture module 8 determines is substantially aligned or associated with the key "E" of keyboard 16. User 18 moves finger 27 to traverse a point associated with the key "Y." Thus, to this point, user 18 has traversed points of keyboard 16 that are associated with keys "K" "E" and "Y." Gesture module 8 determines that the traversed point associated with the key "K" aligns with the sub-gesture of finger 25, and gesture module 8 determines that the traversed points associated with the keys "E" and "Y" align with the sub-gesture of finger 27. As shown in this example, gesture module 8 is able to make such determinations even when fingers 25 and 27 move asynchronously. User 18 further moves finger 25 from the point associated with the key "K" to traverse additional points on UI device that are associated with the keys "B" and "O," are gesture module 8 determines that these traversed points are aligned with the sub-gesture of finger 25.

The incremental recognition algorithm implemented by gesture module 8 is able to predict a top or most likely candidate word for a partial gesture input. As a result of an auto-complete process, user 18 does not necessarily need to input a complete or full word. In FIG. 6, after user 18 has provided the sub-gestures of fingers 25 and 27 to select keys "K" "E" "Y" "B" and "O" using the multi-touch gesture, user 18 may lift up fingers 25 and 27 from keyboard 16 to commit the top suggested, candidate word "KEYBOARD." As a result, the candidate word "KEYBOARD" comprises a greater number of characters than included in a combination of characters associated with the keys selected by user 18 (such that gesture module 8 may perform auto-complete functionality). This top candidate word is prominently shown in suggestion area 59 and is also optionally shown in floating preview area 57.

In the example of FIG. 6, UI module 6 may receive an indication of at least a portion of a first group of one or multiple points traversed by a first sub-gesture of finger 25 before receiving an indication of at least a portion of a second group of one or multiple points traversed by a second sub-gesture of finger 27, and UI module 6 may output the candidate word "KEYBOARD" at a location of UI device 4 that corresponds to a point of the first group of points traversed by the first sub-gesture. Because the sub-gesture of finger 25 traverses a point associated with the key "K" before the sub-gesture of finger 27 traverses points associated with the keys "E" and "Y" in the example of FIG. 6, UI module 6 outputs the candidate word "KEYBOARD" in floating preview area 57 at a location corresponding to a point traversed by the sub-gesture of finger 25 associated with the key "O."

In FIG. 7, user 18 has lifted finger 25 off UI device 4 when compared to the example of FIG. 6. In such fashion, UI module 6 may receive an indication of a termination of the sub-gesture for finger 25, and UI module 6 outputs, in response to this indication, the candidate word "KEYBOARD" in floating preview area 57 at a location that corresponds to a point of the second group of points traversed by the sub-gesture for finger 27. Thus, as is shown in FIG. 7, floating preview area 57 is situated above the key "Y." corresponding to the final point traversed by the sub-gesture for finger 27. In this fashion, UI module 6 can modify the display location of floating preview area 57 when one of fingers 25 or 27 is released by UI device 4. In certain other instances, the location of floating preview area 57 may be based on which sub-gesture (e.g., sub-gesture for finger 25 or 27) is the currently active sub-gesture.

In some instances, user 18 may potentially use fingers 25 and 27 to select keys of keyboard 16 out of order (temporally). For example, user 18 may use finger 25 to first select the "K" and "B" keys, and may then subsequently use finger 27 to select the "E" key and the "Y" key. Finally, user 18 may use finger 25 to select the "O" key. As a result, the ordering of the key selections from the sub-gestures of fingers 25 and 27 may be "K" "B" "E" "Y" "O" (rather than "K" "E" "Y" "B" and "O"). Although user 18 may use fingers 25 and 27 asynchronously to potentially (e.g., mistakenly) enter characters out of order temporally, as in this example, gesture module 8 is capable of associating each of the selected keys with the sub-gesture of finger 25 or the sub-gesture of finger 27 and determining the candidate word (e.g., "KEYBOARD") using a gesture recognition algorithm and/or a language model (e.g., language model 10). As a result, techniques of the present disclosure may potentially relieve some of the burden of user 18 to synchronize fingers 25 and 27 when performing the respective sub-gestures to select characters of a word in a particular order.

Figure 8:
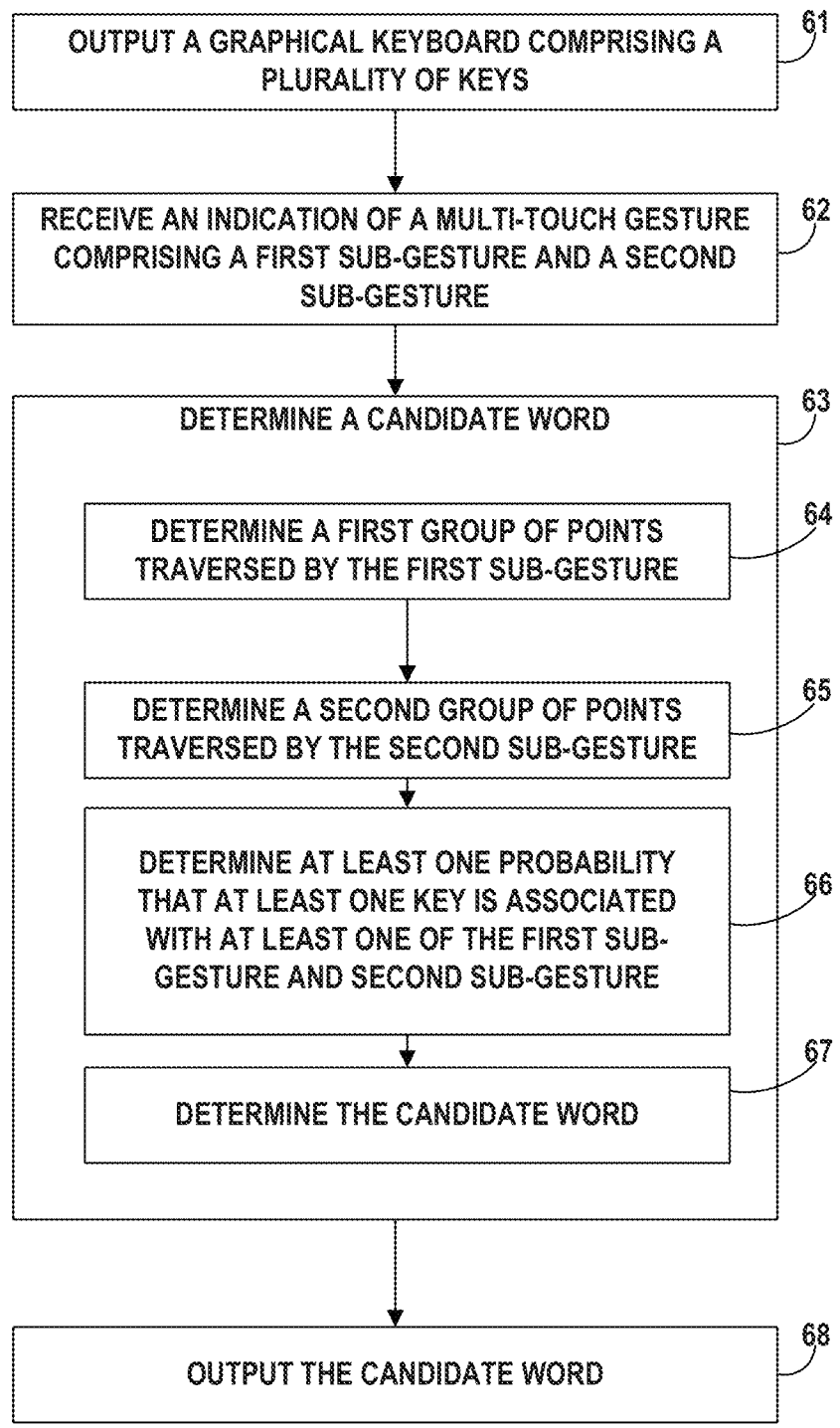
FIG. 8 is a flow diagram illustrating example operations of a computing device to determine a candidate word from a multi-touch gesture, in accordance with one or more techniques of the present disclosure.

FIG. 8 is a flow diagram illustrating example operations of a computing device to determine a candidate word from a multi-point gesture, in accordance with one or more techniques of the present disclosure. For purposes of illustration only, the example operations are described below within the context of computing device 2, as shown in FIGS. 1 and 2.

In the example of FIG. 8, computing device 2 may output, for display at an output device (e.g., output device 46 and/or UI device 4), a graphical keyboard (e.g., graphical keyboard 16) comprising a plurality of keys (61). Computing device 2 receives an indication of a multi-touch gesture detected at a presence-sensitive display, the multi-touch gesture comprising a first sub-gesture that traverses a first group of keys of the plurality of keys and a second sub-gesture that traverses a second group of keys of the plurality of keys (62). Computing device 2 determines, in response to detecting the first sub-gesture and the second sub-gesture, a candidate word based at least in part on the first and second groups of keys (63).

Computing device 2 may determine the candidate word at least by determining, based at least in part on the first sub-gesture, a first group of points traversed by the first sub-gesture (64), and by determining, based at least in part on the second sub-gesture, a second group of points traversed by the second sub-gesture (65). Computing device 2 may determine, based at least in part on the first and second groups of points, at least one probability that at least one key included in at least one of the first and second groups of keys is associated with at least one of the first sub-gesture and the second sub-gesture (66), and may also determine the candidate word based at least in part on the at least one probability that the at least one key is associated with at least one of the first sub-gesture and the second sub-gesture (67). Upon determining the candidate word, computing device 2 outputs, for display at the output device, the candidate word (68). In some examples, the output device includes the presence-sensitive display.

FIGS. 9A-9B are flow diagrams illustrating example operations of a computing device to determine a candidate word from gesture input, in accordance with one or more techniques of the present disclosure. For purposes of illustration only, the example operations are described below within the context of computing device 2, as shown in FIGS. 1 and 2.

In the example of FIGS. 9A-9B, computing device 2 may initially output a graphical keyboard (e.g., keyboard 16) comprising a plurality of keys at a presence-sensitive display (e.g., UI device 4) of computing device 2 (70). Computing device 2 may subsequently detect a gesture path (e.g., path 21A, 21B, 22A, or 22B shown in FIGS. 3A-3D) associated with a particular sub-gesture of a multi-touch gesture input (e.g., a sub-gesture associated with either finger 25 or finger 27) at the presence-sensitive display (72). In response to detecting the gesture path, computing device 2 may create a token having a cost value of zero at the entry node of a lexicon stored on computing device 2 as a lexicon trie (74). Computing device 2 may push the token into an active beam (76).

Computing device 2 may process gesture data for each gesture path of a sub-gesture. For example, computing device 2 may process gesture data for gesture path 22A associated with the sub-gesture of finger 25, gesture data for gesture path 22B associated with the sub-gesture of finger 25, gesture data for gesture path 21A associated with the sub-gesture of finger 27, and gesture data for gesture path 21B associated with the sub-gesture of finger 27. For each gesture path, computing device 2 may perform actions 77 through 118 as shown in FIGS. 9A-9B.

At 77, computing device 2 may process gesture data for an individual (next) gesture path of a sub-gesture (e.g., gesture path 22A) that is part of a multi-touch gesture. Computing device 2 may subsequently select a token from the active beam (78) and create a copy of the token on each child node of the token (80). Computing device 2 may select a token copy (82) and determine an alignment point along the gesture (84). Computing device 2 may determine a cost value representing a probability that the alignment point indicates the letter key of the node on which the token copy is positioned and add the cost value to the token copy (86). Computing device 2 may push the token copy into a next beam (88) and determine whether there are any token copies remaining (90). If there are token copies remaining (94), computing device 2 may select a new token copy (82).

If there are not any token copies remaining (92), computing device 2 may determine whether the token is at a terminal node of the lexicon trie (96). If the token is at a terminal node (98), computing device 2 may copy the word represented by the token to a list of candidate words (102). After copying the word to the list of candidate words, or if the token is not at a terminal node (100), computing device 2 may discard the token (104).

Computing device 2 may subsequently determine whether any tokens remain in the active beam (106). If there are tokens remaining in the active beam (110), computing device 2 may select a new token from the active beam (78). If there are no tokens remaining in the active beam (108), computing device 2 may determine whether any tokens remain in the next beam (112). If there are tokens remaining in the next beam (114), computing device 2 may copy the next beam to the active beam (118), process gesture data for the next gesture path of a sub-gesture (e.g., gesture path 22B) (77), and select a new token from the active beam (78). If there are no tokens remaining in the next beam (116), computing device 2 may output the list of candidate words at the presence-sensitive display (120). The gesture data of each of the individual gesture paths (e.g., gesture paths 22A, 22B, 21A, 21B) may be processed in this matter in order to incrementally detect gesture input during performance by user 18 of a multi-touch gesture comprising individual sub-gestures associated with fingers 25 and 27.

In one example, techniques of the disclosure may be implemented using the following example pseudocode:

```
Initialization:
Create a token t with cost = 0 and index = 0 in the entry node of the
lexicon.
Push t into active_beam
Operations:
while active_beam is not empty do
    Advance_tokens(active_beam, next_beam)
    active_beam = next_beam
    clear next_beam
end
Advance_tokens(active_beam, next_beam):
    for each token t do
        let n be the node of token t
        let k₁ be the letter key of node n
        let p₁ be the current alignment point of token t
        for each child node c of n do
            let k₂ be the letter key of node c
            let t_c be a copy of token t
            Align_key_to_gesture(t_c, k₁, k₂, p₁)
            push t_c into next_beam
        end
        if t is a terminal node then
            copy t to terminal list
        else
            discard t
        end
    end
Align_key_to_gesture(token t, key k₁, key k₂, point p₁):
    find the point p₂ along the gesture that best matches the input
    add the cost to token t
    update the current alignment point of token t to point p₂
```

In the above example pseudocode, active_beam may be active beam 54, next_beam may be next beam 56, and the lexicon may be included in language model 10.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    outputting, by a computing device and for display at a presence-sensitive display, a graphical keyboard comprising a plurality of keys;
    receiving, by the computing device, an indication of a multi-touch gesture detected at the presence-sensitive display, the multi-touch gesture performed by a user having a first finger and a second finger, the multi-touch gesture comprising a first sub-gesture of the first finger that traverses a first group of keys of the plurality of keys and a second sub-gesture of the second finger that traverses a second group of keys of the plurality of keys, the first sub-gesture being disjoint from the second sub-gesture, wherein at least a portion of the first sub-gesture is performed simultaneously with at least a portion the second sub-gesture;
    determining, by the computing device and in response to receiving the indication of the first sub-gesture of the first finger and the second sub-gesture of the second finger, a candidate word based at least in part on the first and second groups of keys, wherein the determining comprises:
        determining, by the computing device and based at least in part on the first sub-gesture of the first finger, a first group of points on the presence-sensitive display traversed by the first sub-gesture;
        determining, by the computing device and based at least in part on the second sub-gesture of the second finger, a second group of points on the presence-sensitive display traversed by the second sub-gesture;
        determining, by the computing device and based at least in part on the first and second groups of points on the presence-sensitive display, at least one probability that at least one key included in at least one of the first and second groups of keys is associated with at least one of the first sub-gesture of the first finger and the second sub-gesture of the second finger; and
        determining, by the computing device, the candidate word based at least in part on the at least one probability that the at least one key is associated with at least one of the first sub-gesture of the first finger and the second sub-gesture of the second finger; and
    outputting, by the computing device and for display at the presence-sensitive display, the candidate word.

2. The method of claim 1, wherein outputting the candidate word comprises:
outputting the candidate word at a location of the presence-sensitive display that corresponds to a point of the first group of points on the presence-sensitive display traversed by the first sub-gesture or a point of the second group of alignment points on the presence-sensitive display traversed by the second sub-gesture.

3. The method of claim 1,
wherein receiving the indication of the gesture at the presence-sensitive display comprises receiving an indication of at least a portion of the first group of points on the presence-sensitive display traversed by the first sub-gesture before receiving an indication of at least a portion of the second group of points on the presence-sensitive display traversed by the second sub-gesture, and
wherein outputting the candidate word comprises outputting the candidate word at a location of the presence-sensitive display that corresponds to a point of the first group of points on the presence-sensitive display traversed by the first sub-gesture.

4. The method of claim 3, wherein receiving the indication of at least the portion of the first group of points on the presence-sensitive display traversed by the first sub-gesture before receiving the indication of at least the portion of the second group of points on the presence-sensitive display traversed by the second sub-gesture comprises receiving an indication of multiple points of the first group of points before receiving the indication of at least the portion of the second group of points.

5. The method of claim 4, wherein receiving the indication of the multiple points of the first group of points on the presence-sensitive display traversed by the first sub-gesture before receiving the indication of at least the portion of the second group of points on the presence-sensitive display traversed by the second sub-gesture comprises receiving the indication of the multiple points of the first group of points before receiving an indication of multiple points of the second group of points.

6. The method of claim 1, further comprising:
receiving, by the computing device, an indication of additional points on the presence-sensitive display traversed by at least one of the first sub-gesture and the second sub-gesture across the graphical keyboard; and
determining, by the computing device, whether the additional points are associated with at least one of the first sub-gesture and the second sub-gesture,
wherein outputting the candidate word comprises outputting the candidate word at a location of the presence-sensitive display that corresponds to one of the additional points.

7. The method of claim 6, wherein at least one of the first sub-gesture and the second sub-gesture comprises one or more segments.

8. The method of claim 6, wherein determining the candidate word further comprises determining the candidate word based at least in part on the association of the additional points with at least one of the first sub-gesture and the second sub-gesture.

9. The method of claim 1, wherein the first group of points on the presence-sensitive display traversed by the first sub-gesture comprises a first sequence of points, wherein the second group of points on the presence-sensitive display traversed by the second sub-gesture comprises a second sequence of points, and wherein the method further comprises:

determining, by the computing device, a first distance between a final point of the first sequence of points on the presence-sensitive display traversed by the first sub-gesture and a boundary of the graphical keyboard; and
determining, by the computing device, a second distance between a final point of the second sequence of points on the presence-sensitive display traversed by the second sub-gesture and the boundary of the graphical keyboard,
wherein outputting the candidate word comprises outputting the candidate word at a location of the presence-sensitive display that corresponds to either the final point of the first sequence of points or the final point of the second sequence of points based at least in part on a comparison the first distance to the second distance.

10. The method of claim 9, wherein outputting the candidate word comprises outputting the candidate word at a location of the presence-sensitive display that corresponds to the final point of the first sequence of points on the presence-sensitive display traversed by the first sub-gesture when the first distance is less than the second distance.

11. The method of claim 9, wherein outputting the candidate word comprises outputting the candidate word at a location of the presence-sensitive display that corresponds to the final point of the second sequence of points on the presence-sensitive display traversed by the second sub-gesture when the second distance is less than the first distance.

12. The method of claim 9, wherein the boundary of the graphical keyboard comprises a topmost boundary of the graphical keyboard.

13. The method of claim 1, wherein the first group of points on the presence-sensitive display traversed by the first sub-gesture comprises a first sequence of points, wherein the second group of points on the presence-sensitive display traversed by the second sub-gesture comprises a second sequence of points, and wherein the method further comprises:
determining, by the computing device, whether a final point of the first sequence of points or a final point of the second sequence of points was received at the presence-sensitive display more recently,
wherein outputting the candidate word comprises outputting the candidate word at a location of the presence-sensitive display corresponding to the one of the final point of the first sequence of points and the final point of the second sequence of points based at least in part on whether the final point of the first sequence of points or the final point of the second sequence of points was received more recently.

14. The method of claim 1, further comprising:
receiving, by the computing device, an indication of a termination of the first sub-gesture at the presence-sensitive display,
wherein outputting the candidate word comprises outputting the candidate word at a location of the presence-sensitive display that corresponds to a point of the second group of points on the presence-sensitive display traversed by the second sub-gesture responsive to receiving the indication of the termination of the first sub-gesture.

15. The method of claim 1, further comprising:
receiving, by the computing device, a first indication of a termination of the first sub-gesture and a second indication of a termination of the second sub-gesture at the presence-sensitive display,
wherein outputting the candidate word comprises outputting the candidate word responsive to receiving the first indication of the termination of the first sub-gesture and the second indication of the termination of the second sub-gesture.

16. The method of claim 1, wherein the first group of keys are associated with a first group of characters, wherein the second group of keys are associated with a second group of characters, and wherein the candidate word comprises characters that are not included in either the first group of characters or the second group of characters, such that the computing device performs auto-correct functionality to output the candidate word.

17. The method of claim 1, wherein the first group of keys are associated with a first group of characters, wherein the second group of keys are associated with a second group of characters, and wherein the candidate word comprises a greater number of characters than included in a combination of the first and second group of characters, such that the computing device performs auto-complete functionality to output the candidate word.

18. The method of claim 1, wherein determining the first group of points on the presence-sensitive display traversed by the first sub-gesture is based at least in part on one or more of:
 a length of a segment associated with the first sub-gesture, wherein the segment comprises a path traversed by the first sub-gesture at the presence-sensitive display;
 a direction of movement associated with the segment of the first sub-gesture;
 a curvature of the segment of the first sub-gesture;
 a local speed that represents a rate at which the segment of the first sub-gesture is detected; and
 a global speed that represents a rate at which the first sub-gesture is detected.

19. The method of claim 18, wherein determining the at least one probability that the at least one key included in the at least one of the first and second groups of keys is associated with at least one of the first sub-gesture and the second sub-gesture comprises:
 determining a first probability that the at least one key is included in the first group of keys associated with the first sub-gesture;
 determining a second probability that the at least one key is included in the second group of keys associated with the second sub-gesture;
 if the first probability is greater than the second probability, determining that the at least one key is included in the first group of keys; and
 if the second probability is greater than the first probability, determining that the at least one key is included in the second group of keys.

20. The method of claim 19, wherein determining the first probability is based at least in part on one or more of:
 a length of a segment associated with the first sub-gesture, wherein the segment comprises a path traversed by the first sub-gesture at the presence-sensitive display;
 a direction of movement associated with the segment of the first sub-gesture;
 a curvature of the segment of the first sub-gesture;
 a local speed that represents a rate at which the segment of the first sub-gesture is detected;
 a global speed that represents a rate at which the first sub-gesture is detected; and
 a distance between one point of the first group of points and a region that is associated with at least a portion of the at least one key.

21. The method of claim 1, wherein the candidate word is determined contemporaneously with receiving at least one of the first sub-gesture and the second sub-gesture at the presence-sensitive display.

22. The method of claim 1, wherein determining the candidate word further comprises:
 determining, by the computing device, a respective cost value for each of at least two keys included in at least one of the first and second groups of keys, wherein each of the respective cost values represents a probability that a point of the first group of points or the second group of points indicates the corresponding key of the at least two keys;
 comparing, by the computing device, the respective cost values for the at least two keys to determine a combination of keys having a combined cost value that satisfies a threshold.

23. The method of claim 22, wherein determining the respective cost value for each of the at least two keys comprises determining a respective lexical cost value for each of the at least two keys, wherein each of the respective lexical cost values represents a probability that a letter represented by the corresponding key of the at least two keys is included in the candidate word, and wherein determining the respective lexical cost value for each of the at least two keys comprises comparing each of the at least two keys with a language model.

24. The method of claim 1,
 wherein determining the candidate word further comprises determining the candidate word and one or more other suggested words based at least in part on the at least one probability that the at least one key is associated with at least one of the first sub-gesture and the second sub-gesture, and
 wherein outputting the candidate word comprises outputting the candidate word along with the one or more other suggested words, such that the candidate word is visually distinguished from the one or more other suggested words.

25. The method of claim 1, wherein the first sub-gesture and the second sub-gesture comprise swipe gestures, tap gestures, or a combination thereof.

26. The method of claim 1, wherein determining the at least one probability that the at least one key included in at least one of the first and second groups of keys is associated with at least one of the first sub-gesture and the second sub-gesture comprises determining the at least one probability further based at least in part of one or more words included in a language model.

27. A computing device, comprising:
 at least one processor,
 wherein the at least one processor is configured to:
 output, for display at a presence-sensitive display, a graphical keyboard comprising a plurality of keys;
 receive an indication of a multi-touch gesture detected at the presence-sensitive display, the multi-touch gesture performed by a user having a first finger and a second finger, the multi-touch gesture comprising a first sub-gesture of the first finger that traverses a first group of keys of the plurality of keys and a second sub-gesture of the second finger that traverses a second group of keys of the plurality of keys, the first sub-gesture being disjoint from the second sub-gesture, wherein at least a portion of the first sub-gesture is performed simultaneously with at least a portion the second sub-gesture;
 determine, in response to receiving the indication of the first sub-gesture of the first finger and the second sub-gesture of the second finger, a candidate word based at least in part on the first and second groups of keys, wherein the determining comprises:

determining, based at least in part on the first sub-gesture of the first finger, a first group of points on the presence-sensitive display traversed by the first sub-gesture;

determining, based at least in part on the second sub-gesture, a second group of points on the presence-sensitive display traversed by the second sub-gesture of the second finger;

determining, based at least in part on the first and second groups of points on the presence-sensitive display, at least one probability that at least one key included in at least one of the first and second groups of keys is associated with at least one of the first sub-gesture of the first finger and the second sub-gesture of the second finger; and determining the candidate word based at least in part on the at least one probability that the at least one key is associated with at least one of the first sub-gesture of the first finger and the second sub-gesture of the second finger; and output, for display at the presence-sensitive display, the candidate word.

28. A non-transitory computer-readable storage device medium encoded with instructions that, when executed, cause at least one processor to:

output, for display at a presence-sensitive display, a graphical keyboard comprising a plurality of keys;

receive an indication of a multi-touch gesture detected at the presence-sensitive display, the multi-touch gesture performed by a user having a first finger and a second finger, the multi-touch gesture comprising a first sub-gesture of the first finger that traverses a first group of keys of the plurality of keys and a second sub-gesture of the second finger that traverses a second group of keys of the plurality of keys, the first sub-gesture being disjoint from the second sub-gesture, wherein at least a portion of the first sub-gesture is performed simultaneously with at least a portion the second sub-gesture;

determine, in response to receiving the indication of the first sub-gesture of the first finger and the second sub-gesture of the second finger, a candidate word based at least in part on the first and second groups of keys, wherein the determining comprises:

determining, based at least in part on the first sub-gesture, a first group of points on the presence-sensitive display traversed by the first sub-gesture of the first finger;

determining, based at least in part on the second sub-gesture, a second group of points on the presence-sensitive display traversed by the second sub-gesture of the second finger;

determining, based at least in part on the first and second groups of points on the presence-sensitive display, at least one probability that at least one key included in at least one of the first and second groups of keys is associated with at least one of the first sub-gesture of the first finger and the second sub-gesture of the second finger; and determining the candidate word based at least in part on the at least one probability that the at least one key is associated with at least one of the first sub-gesture of the first finger and the second sub-gesture of the second finger; and output, for display at the presence-sensitive display, the candidate word.

* * * * *